United States Patent
Gong et al.

(10) Patent No.: US 10,986,586 B2
(45) Date of Patent: *Apr. 20, 2021

(54) ONE METHOD FOR PATHLOSS ESTIMATION

(71) Applicant: Huawei Technologies Co., Ltd., Shenzhen (CN)

(72) Inventors: Zhengwei Gong, Ottawa (CA); Javad Abdoli, Kanata (CA); Mohammadhadi Baligh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,131

(22) Filed: Aug. 19, 2019

(65) Prior Publication Data
US 2019/0373563 A1 Dec. 5, 2019

Related U.S. Application Data

(63) Continuation of application No. 16/198,595, filed on Nov. 21, 2018, now Pat. No. 10,420,036, which is a
(Continued)

(51) Int. Cl.
*H04W 52/24* (2009.01)
*H04B 17/309* (2015.01)
(Continued)

(52) U.S. Cl.
CPC ........ *H04W 52/242* (2013.01); *H04B 17/309* (2015.01); *H04B 17/327* (2015.01); *H04B 17/3911* (2015.01); *H04W 52/146* (2013.01)

(58) Field of Classification Search
CPC ........................ H04W 52/242; H04B 17/309
(Continued)

(56) References Cited

U.S. PATENT DOCUMENTS 9,179,419 B2 11/2015 Park et al.
9,246,558 B2 1/2016 Ng et al.
(Continued)

FOREIGN PATENT DOCUMENTS

CN 102244923 A 11/2011
CN 104244392 A 12/2014
(Continued)

OTHER PUBLICATIONS

Huawei, et al., "UL power control for NR MIMO," 3GPP TSG RAN WG1 Meeting #86bis, R1-1608821, Lisbon, Portugal, Oct. 10-14, 2016, 4 pages.
(Continued)

*Primary Examiner* — John J Lee
(74) *Attorney, Agent, or Firm* — Slater Matsil, LLP

(57) ABSTRACT

A method of path loss estimation at a user equipment (UE) comprises receiving a downlink cell-specific signal block comprising a synchronization channel and a broadcasting channel demodulation reference signal; receiving control information indicative of a signal transmission power of the downlink cell-specific signal block; and determining an estimated path loss for the UE based at least in part on the signal transmission power of the downlink cell-specific signal block and a received power of the downlink cell-specific signal block filtered using a layer 3 filtering coefficient.

20 Claims, 18 Drawing Sheets

Related U.S. Application Data continuation of application No. PCT/CN2017/118368, filed on Dec. 25, 2017.

(60) Provisional application No. 62/440,464, filed on Dec. 30, 2016.

(51) Int. Cl.
*H04B 17/391* (2015.01)
*H04B 17/327* (2015.01)
*H04W 52/14* (2009.01)

(58) Field of Classification Search
USPC .......... 455/522, 69, 509, 67.11, 452.1, 422.1
See application file for complete search history.

(56) References Cited

U.S. PATENT DOCUMENTS

| | | | |
|---|---|---|---|
| 9,247,468 B2 | 1/2016 | Ishii | |
| 9,253,731 B2 | 2/2016 | Parkvall et al. | |
| 2014/0286219 A1* | 9/2014 | Siomina | H04J 11/0023 370/311 |
| 2015/0223181 A1* | 8/2015 | Noh | H04L 25/0226 370/329 |
| 2017/0078973 A1* | 3/2017 | Ohwatari | H04W 52/325 |
| 2018/0176948 A1* | 6/2018 | Islam | H04W 52/242 |

FOREIGN PATENT DOCUMENTS

| | | |
|---|---|---|
| JP | 2014529205 A | 10/2014 |
| JP | 2014534667 A | 12/2014 |
| JP | 2015513264 A | 4/2015 |
| KR | 20120096407 A | 8/2012 |

OTHER PUBLICATIONS

Mediatek Inc., "DL RRM Measurement over Narrowband Reference Signals," 3GPP TSG RAN WG1 Meeting #87, R1-1612123, Reno, USA, Nov. 14-18, 2016, 8 pages.

CATT, "NR RRM measurements and mobility management," 3GPP TSG RAN WG1 #86bis, R1-1608789, Lisbon, Portugal, Oct. 10-14, 2016, 2 pages.

LG Electronics, "Synchronization aspects of extension carrier," 3GPP TSG RAN WG1 #68, R1-120422, Dresden, Germany, Feb. 6-10, 2012, 4 pages.

Alcatel-Lucent Shanghai Bell, et al., "PUSCH power control for uplink CoMP," 3GPP TSG RAN WG1 Meeting #67, R1-114053, San Francisco, USA, Nov. 14-18, 2011, 6 pages.

Nokia et al., "Mobility Measurement in Idle and Inactive Mode", 3GPP TSG-RAN WG2 Meeting #96, R2-167712, Nov. 14-18, 2016, 5 Pages, Reno, USA.

\* cited by examiner

ONE METHOD FOR PATHLOSS ESTIMATION

CROSS-REFERENCE TO RELATED APPLICATIONS

This application is a continuation of U.S. patent application Ser. No. 16/198,595, filed on Nov. 21, 2018, which is a continuation of PCT Application No. PCT/CN2017/118368, filed on Dec. 25, 2017, which claims the benefit of U.S. Provisional Application No. 62/440,464, filed on Dec. 30, 2016, all of which applications are hereby incorporated herein by reference.

TECHNICAL FIELD

The present disclosure relates generally to wireless networks and in particular, to estimating path loss between a base station and user equipment.

BACKGROUND

Path loss (PL) estimation between a base station and user equipment (UE) allows the UE to efficiently manage its transmission power for uplink transmission. And in LTE (long-term evolution), PL is always estimated based on a cell-specific reference signal (CRS). However, CRS-only based PL estimation is not flexible for a new radio (NR) system. As such, more specific path loss estimation measurements and methods would be welcomed by the industry.

SUMMARY

In accordance with a first embodiment of the present disclosure, there is provided a method of path loss estimation at a user equipment (UE), comprising receiving, by the UE, one or more distinct downlink cell-specific signal blocks, each distinct downlink cell-specific signal block comprising a synchronization channel and a broadcasting channel demodulation reference signal, receiving, by the UE, control information indicative of a signal transmission power of each of the one or more distinct downlink cell-specific signal blocks, and determining, by the UE, one or more estimated path losses for the UE, each estimated path loss corresponding to one distinct downlink cell-specific signal block of the one or more distinct downlink cell-specific signal blocks and each estimated path loss being determined based at least in part on the signal transmission power of the one distinct downlink cell-specific signal block and a received power of the one distinct downlink cell-specific signal block filtered using a layer 3 filtering coefficient.

In accordance with a second embodiment of the present disclosure, there is provided a user equipment (UE) comprising a non-transitory memory storage comprising instructions, and one or more processors in communication with the memory storage, wherein the one or more processors execute the instructions to receive one or more distinct downlink cell-specific signal blocks, each distinct downlink cell-specific signal block comprising a synchronization channel and a broadcasting channel demodulation reference signal, receive control information indicative of a signal transmission power of each of the one or more distinct downlink cell-specific signal blocks, and determine one or more estimated path losses for the UE, each estimated path loss corresponding to one distinct downlink cell-specific signal block of the one or more distinct downlink cell-specific signal blocks and each estimated path loss being determined based at least in part on the signal transmission power of the one distinct downlink cell-specific signal block and a received power of the one distinct downlink cell-specific signal block filtered using a layer 3 filtering coefficient.

It is to be expressly understood that the description and drawings are only for the purpose of illustration of certain embodiments of the invention and are an aid for understanding. They are not intended to be a definition of the limits of the invention.

DETAILED DESCRIPTION OF ILLUSTRATIVE EMBODIMENTS

Figure 1:
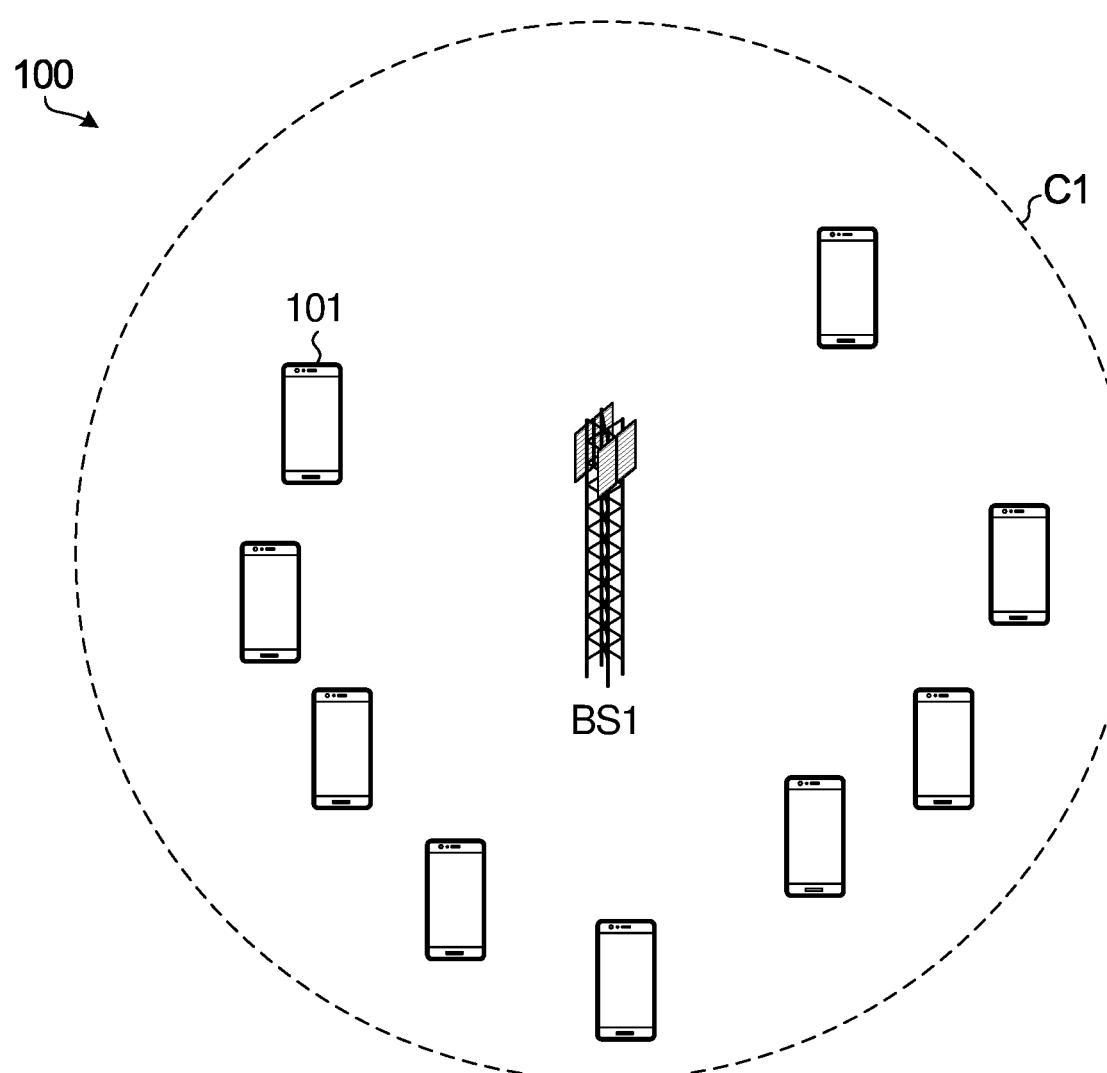
FIG. 1 is a block diagram of a radio access network showing a base station and corresponding UEs within a coverage area of the base station, in accordance with a non-limiting embodiment.

With reference to FIG. 1, there is shown a radio access network 100 that may be capable of supporting various non-limiting embodiments of the present invention. In particular, there is shown a base station BS1 that communicates with mobile user equipment (UEs) using electromagnetic waves. The base station BS1 is connected to a core network using, for example, fixed high-capacity links such as fiber optic links. Only one base station BS1 is shown in FIG. 1 for simplicity, but it should be understood that there is no particular limit on the number of base stations in the radio access network 100.

The base station BS1 communicates with the UEs in a coverage area C1 of the base station BS1. In the embodiment in FIG. 1, there is one coverage area C1 shown for simplicity, however it should be appreciated that there may be multiple coverage areas. Each respective coverage area may be associated with a base station. In this regard, as a UE migrates from one coverage area to another, communication switches over to the base station associated with the new coverage area using a process known as handoff. In some embodiments, UEs may communicate with the base station associated with more than one coverage area, depending on various operational factors.

The UEs may operate in two or more states. For example, each of the UEs may operate in an "IDLE" or an "ACTIVE" state. In the IDLE state, a particular one of the UEs, for example UE 101, is not in active communication with the base station BS1. In the ACTIVE state, the particular one of the UEs is in active communication with the base station BS1. For example, when the particular UE 101 connects to the base station BS1, its state prior to actively communicating with the base station BS1 may be IDLE and then after it is in active communication, its state may be ACTIVE. In accordance with a specific and non-limiting example of implementation, an RRC (Radio Resource Control) protocol layer exists in the UE 101 and its function includes establishing, maintaining and releasing of an RRC connection between the UE 101 and the base station BS1. In this example, the UE 101 is in the ACTIVE state when an RRC connection has been established (i.e., RRC_CONNECTED) and if no RRC connection has been established, the UE 101 is in the IDLE state (i.e., RRC_IDLE). The nomenclature of the various states may differ in practical implementations and as such the state names are provided only for example purposes.

The UEs can take on various forms. In one non-limiting embodiment, the UEs may be smartphones, tablets, laptops, vehicle-mounted communication devices, or a variety of such devices in different proportions throughout the radio access network. Each of the UEs is equipped with hardware, software and/or control logic to execute a variety of functions. For example, the UE 101 may be equipped with an RF communication unit (including antenna(s), demodulator, processor, etc.) for establishing and/or maintaining a radio link with a base station. The UE 101 may further include a data decoder to decode symbols received from the RF communication unit into data streams and a data encoder to encode a data stream into symbols for transmission to the base station BS1 via the RF communication unit. The data streams themselves are processed by a computing device in the UE 101. To this end, the computing device comprises a processor, a memory, one or more buses (e.g., data bus, control bus, etc.) and an I/O interface. The I/O interface, in addition to interfacing with the data encoder and data decoder, interfaces with a user of the UE 101 via one or more input and/or output devices, such as a touch screen, a microphone, a loudspeaker, a keyboard, etc.

Figure 2:
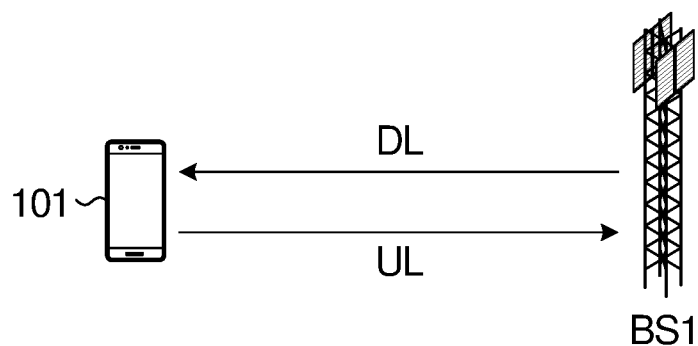
FIG. 2 illustrates uplink and downlink communication, in accordance with a non-limiting embodiment.

With additional reference to FIG. 2, communication from the base station BS1 to the UEs is referred to as downlink (DL) communication. Communication from the UEs to the base station is referred to as uplink (UL) communication.

Figure 3:
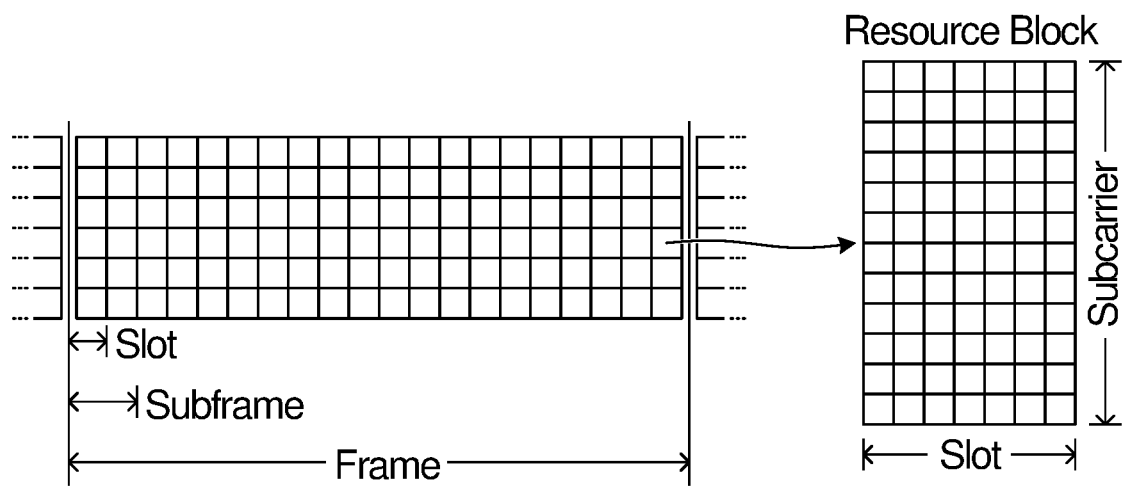
FIG. 3 schematically illustrates resource blocks, in accordance with a non-limiting embodiment.

The base station BS1 communicates with the UEs over portions of the RF spectrum known as "resource elements" or "resource blocks". With reference to FIG. 3, for example, time and frequency may be divided into frames and carriers, respectively. A time frame may be divided into subframes, which may in turn be further divided into time slots. One time slot at a particular frequency carrier may be referred to as a resource block. Multiple resource blocks (at different frequency carriers) can occupy the same time slot and multiple resource blocks (occupying different time slots) can occupy the same frequency carrier. For a resource block associated with a particular time slot and a particular frequency carrier, the time slot may be divided into plural symbols or other sub-divisions of a slot, whereas the frequency carrier may be divided into plural sub-carriers.

The resource blocks may be allocated to UL and DL communication between the base station BS1 and the UEs in various ways. For example, the UEs may transmit UL frames and the base station BS1 may transmit DL frames. The UL frames and DL frames may be separated either in frequency or in time. In some embodiments, UL frames and DL frames are separated by frequency and are transmitted continuously and synchronously. In other embodiments, UL and DL subframes may be transmitted on the same frequency and multiplexed in the time domain. Various other UL and DL communication configurations are possible in other embodiments.

The DL and/or UL communication may be used with multiple antenna ports. Multiple antenna ports can be used to provide greater data reliability (transmit diversity) and/or to increase data rate (spatial multiplexing). For example, in transmit diversity multiple antenna ports may be used at the base station BS1 to transmit the same amount of data as one antenna port. Spatial multiplexing, for example, may use multiple antenna ports at the base station BS1 to send data to UEs that have more than one receiving antenna. Beamforming is a signal processing technique that is used for directing signal transmission and/or reception, when multiple antenna ports are used, and may be used at the base station BS1 and/or the UEs. Precoding may be used in implementing beamforming techniques such that signals emitted from the transmit antennas are provided with appropriate phase and gain weighting. It is understood that appropriate phase and gain weighting are only examples, any other suitable spatial parameters may apply in the embodiments. Precoding may require knowledge of the channel state information (CSI) at the transmitter and/or the receiver. Multiple antennas at the base station BS1 and/or the UEs may be provided, particularly at transmission frequencies above 6 GHz. It should be appreciated that multiple input multiple output (MIMO) using multiple transmit and receive antennas may provide better signal performance and/or a higher data rate.

The DL communication may contain one or more physical signals typically used by the UEs for purposes of synchronization and/or reference. The signals may be transmitted on resource blocks spread throughout the DL frame in specific and various locations. For example, the signals may be transmitted from the base station BS1 in DL communication and received at the UEs in one or more signal blocks, which may correspond to signals mapped to resource units or resource blocks. The one or more physical signals transmitted from the base station BS1 to the UEs may include one or more synchronization signals, which are typically used by the UEs for connecting to the base station BS1. The one or more signals may include one or more reference signals that can ultimately be used by the UEs for estimating path loss. The signals and/or blocks may be cell-specific and/or may be UE-specific. For instance, the cell-specific signals or blocks may be used by any of the UEs, whereas the UE-specific signals or blocks may be intended for use by one or more specific UEs.

The synchronization signals transmitted from base station BS1 to the UEs may include, for example, a primary synchronization signal (PSS) and a secondary synchronization signal (SSS), which are conventionally used only for synchronization purposes by the UEs. The number of synchronization signals may vary in practical implementations and the aforementioned synchronization signals are provided for example purposes. It should be appreciated that in prior communication techniques (e.g., Long Term Evolution (LTE) communication) the synchronization signals (e.g., PSS and SSS) were used for synchronization purposes but were not used for path loss estimation purposes.

The reference signals transmitted from base station BS1 to the UEs may include, for example:
- a cell-specific reference signal (CRS), which may be used by any of the UEs to compensate the DL frame for channel frequency response and/or cross-channel effects, and/or ultimately used in the path loss estimation;
- a mobility measurement reference signal (MRS), which may be used by any of the UEs in one cell for handover measurement;
- a beam measurement reference signal (BRS), which may be used by any of the UEs in one cell for the identification of beams;
- a demodulated reference signal for broadcasting channels (B-DMRS), which may be used for any UE in one cell to demodulate the broadcasting channel (e.g. PBCH);
- a UE-specific reference signal: which may be specifically configured for one UE (e.g., UE 101) to measure the channel link (e.g. CSI-RS) and demodulate the allocated physical channel (e.g., DMRS) for this UE;
- and/or any other suitable reference signal.

The reference signals may be grouped into reference signal sets. For instance, each signal set may have a group of distinct reference signals. The grouping of the reference signals in the set may be based on signals that correspond to a specific transmission beam and may be used for beam identification.

Figure 14:
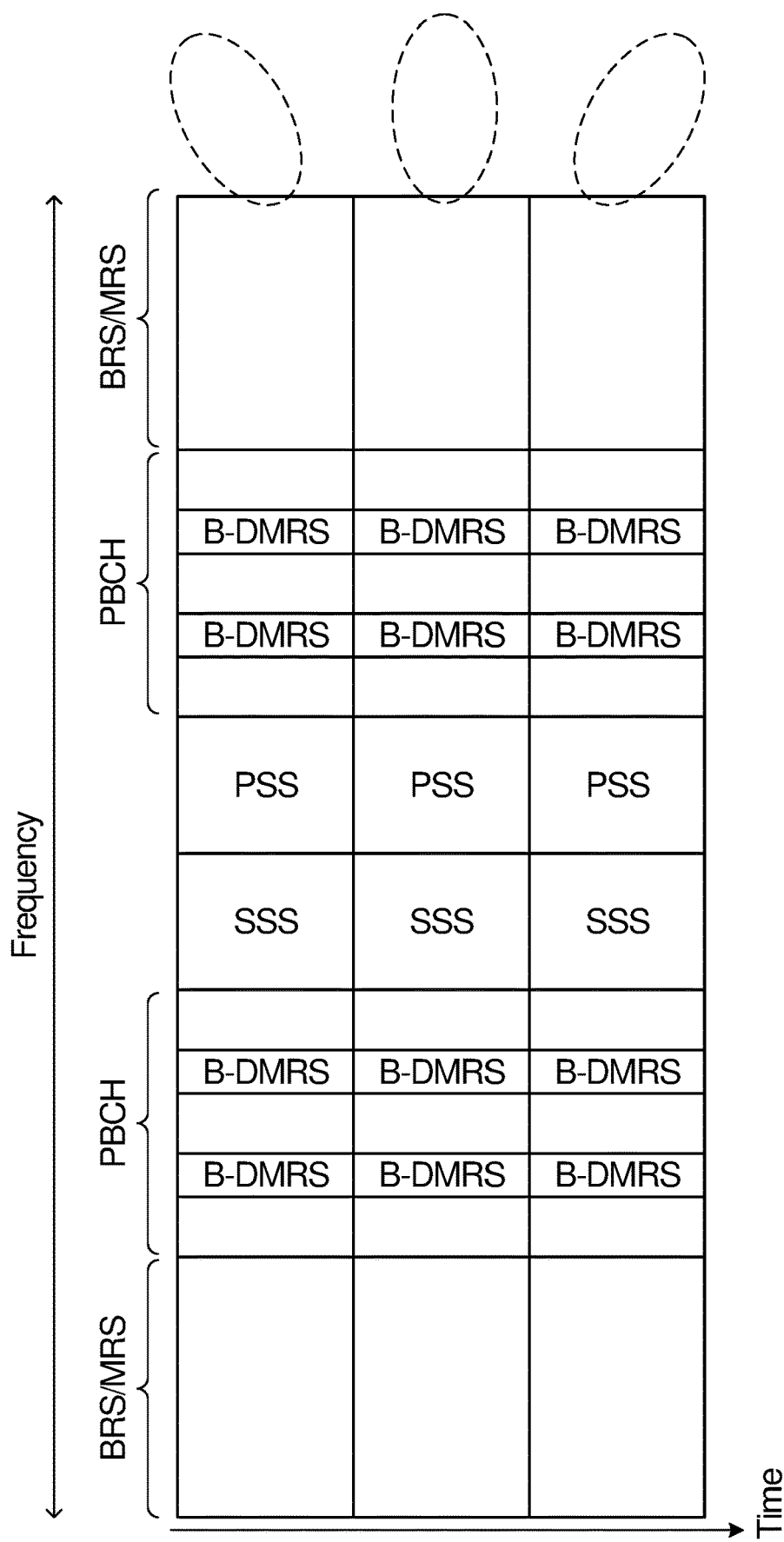
FIG. 14 illustrates various reference signals, in accordance with a specific and non-limiting example.

In accordance with a specific and non-limiting example, FIG. 14 illustrates various reference signals. In this example, the various reference signals are illustrated in frequency units for three UEs. In addition, the various reference signals are also illustrated in time units. Each of the three UEs would receive signals that include BRS, MRS, PSS, SSS and DMRS for PBCH.

As stated above, the reference signals may be grouped into reference signal sets. Each reference signal set is associated with one beam wherein each reference signal set includes its own BRS, MRS, PSS, SSS and DMRS for PBCH as illustrated in FIG. 14. As such, each of the UEs would receive reference signals that include BRS, MRS, PSS, SSS and DMRS for PBCH.

The nomenclature of the various reference signals may differ in practical implementations and as such the reference signal names are provided only for example purposes. It should therefore be appreciated that specific reference signals can be provided for channel synchronization, channel measurement, beam identification, demodulating a broadcast/unicast channel and/or any other suitable function.

Some of the aforementioned signals may only be used by the UEs, when in the ACTIVE state, which has been described above as meaning that the UE is in active communication with the base station. It follows that when the UE 101 is in the IDLE state, the UE 101 would typically not use the signals that are UE-specific.

Figure 15B:
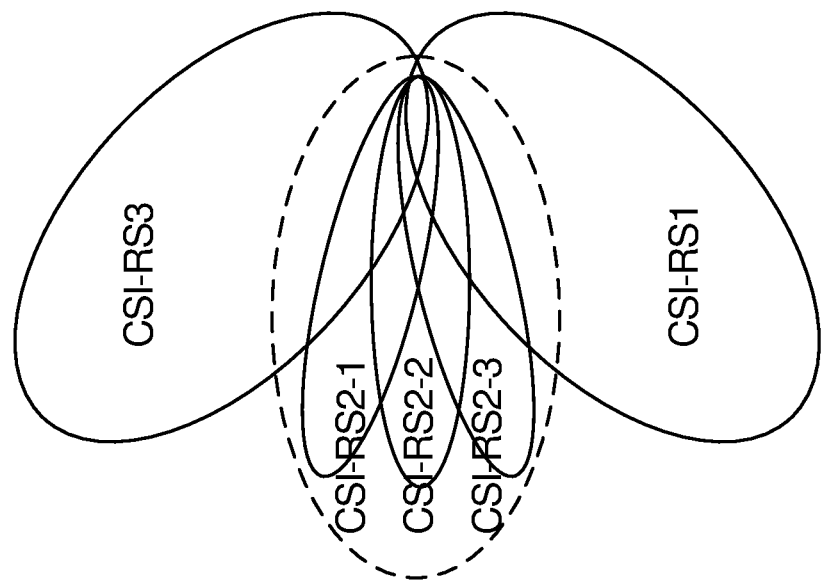
FIGS. 15A and 15B illustrate the use of reference signals for beam identification measurements, in accordance with specific and non-limiting examples.
Figure 15A:
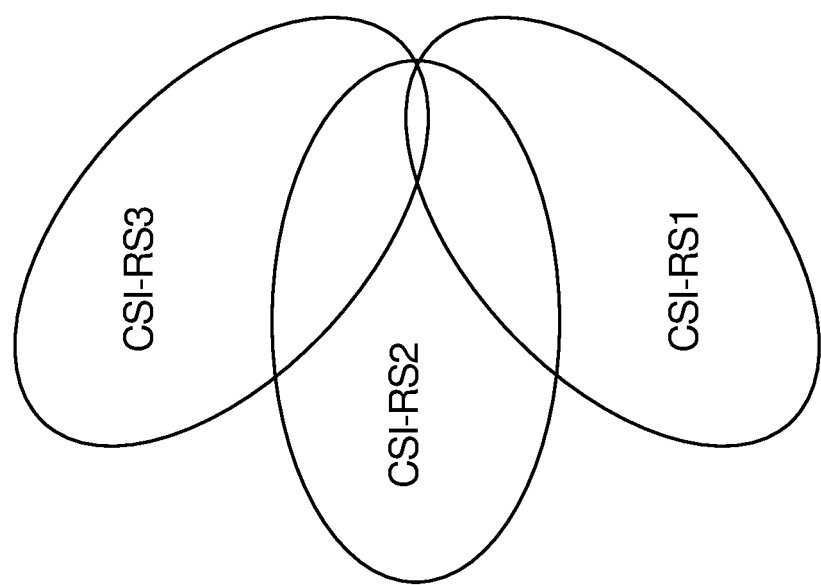

In accordance with a specific and non-limiting example, FIGS. 15A and 15B illustrate the use of reference signals and reference signal sets for beam identification measurements. In the example in FIG. 15A, three reference signals CSI-RS1, CSI-RS2, CSI-RS3 can be separately configured for the measurements of three respective wide beams. Turning now to the example in FIG. 15B, three wide beams can similarly be measured. The second wide beam, CSI-RS2, can be measured using three narrow beams. More specifically, in this example, the three narrow beams can be measured from three reference signals CSI-RS2-1 CSI-RS2-2 CSI-RS2-3 in a reference signal set. Accordingly, in this example, to measure the second wide beam, all three of the narrow beam based measurements can be combined (e.g., averaged) to determine the second wide beam measurement. As such, in the example in FIG. 15B, the second wide beam measurement is based on the reference signal set.

It should be appreciated that at least some of the signals described herein have not conventionally been generated for the purpose of path loss estimation. It should further be appreciated that the use, for path loss estimation, of signals not conventionally used for path loss estimation allows path loss estimation to be conducted without increasing the base station transmission overhead.

The DL communication may include the transmission of other information. For example, the DL frame may contain one or more channels. The one or more channels may be transmitted on resource blocks spread throughout the DL frame in specific and various locations. The one or more channels may include one or more control channels and/or one or more broadcasting channels. For example, the control channels may provide control information needed to manage the transmission of data and/or enable connecting to the base station BS1. For instance, the control information may include signal transmission power (TxP) and/or filtering coefficients, as discussed elsewhere in this document. In general terms, the signal transmission power (TxP) information is information that may include information such as the transmitted power level of a reference signal, of signals in a block or a set, and/or of blocks or sets themselves. The broadcasting channels, for example, may include one or more of the aforementioned channels for that transmission of data from the base station BS1 to one or more of the UEs. The broadcasting channels may be associated with respective broadcasting channel demodulation reference signals, for the purpose of assisting in demodulating the respective broadcasting channel.

Considering now the particular UE 101, in this example, the UE 101 may establish an active connection with the base station BS1 by tuning to a particular frequency channel and receiving the one or more synchronization signals. At this point in time, the UE 101 is in the IDLE state. From the one or more synchronization signals, the UE 101 is able to receive further information in the DL frame and can ultimately determine the location of one or more of the reference signals. From receiving the one or more reference signals, the UE 101 can ultimately determine a corresponding path loss estimation, which is discussed further elsewhere in this document. From the path loss estimation, the UE 101 may determine the transmission power of the UL communication (e.g., the power of UL frames) from the UE 101 to the base station BS1, which is used to establish active communication with the base station BS1. Once the UE 101 is in active communication with the base station BS1, the state of the UE 101 transitions from the IDLE state to the ACTIVE state. After establishing an active connection, there continues to be power control of the transmission power of the UL communication (e.g., the power of UL frames) from the UE 101 to the base station BS1, and this could be "closed loop" or "open loop". In open loop power control, the UE 101 determines its transmission power by its own power setting algorithm; in closed loop power control, some feedback input is provided by the base station BS1 for the adjustment transmission power.

The UE 101 may process the received DL communication (e.g., DL frames, resource blocks, signals, channels, signal set, etc.) to determine a received power (RxP). The determination of RxP may be implemented in various forms. For example, a received signal, signal block, signal set, and/or resource block may be processed using Layer 1 (L1), Layer 2 (L2) and/or Layer 3 (L3) "filtering coefficients" depending on various operational factors to obtain the received power (RxP), where L1 refers to the physical (or bit) layer, L2 refers to the data link (or frame) layer and L3 refers to network (or packet) layer, as is commonly used in the industry. Moreover, network layer L3 may also be referred to as "high layer". The processing of a received resource block, signal, signal set, channel, or the like, using an L3 filtering coefficient may be referred to as "L3 filtering", whereas the processing of a received resource block, signal, signal set, channel, or the like, using L1 and/or L2 filtering coefficients may be referred to as "L1 and/or L2 filtering". Generally, a received power RxP determined by processing at least one of resource block, signal, signal set, channel, or the like, may also be referred to as a reference signal received power (RSRP). RSRP based on L3 filtering is L3-RSRP and RSRP based on L1 and/or L2 filtering is L1-RSRP/L2-RSRP.

Moreover, indication for layer 3, layer 2 and/or layer 1 filtering coefficients can be optional. For example, in the case of a UE without an RRC connection (e.g., when the UE is in the IDLE and/or INACTIVE states), a L3 filtering coefficient may be obtained from memory 2208 and set as a default value without any indication being provided from the base station. Similarly, in the case of a UE in the ACTIVE state, an L1 and/or L2 filtering coefficient may be obtained from memory 2208 and set as default value(s) without any indication being provided from the base station. This may apply to one or more of the embodiments described herein.

In accordance with an embodiment, L1 and/or L2 filtering only occurs when the UE 101 is in the ACTIVE state. For example, when the UE 101 is configured with at least one L1 or L2 filtering coefficient and to measure the received power (RxP) of at least one UE-specific reference signal, the UE 101 may determine the filtered RxP by the formula:

$$G_n = (1-\beta) \cdot G_{n-1} + \beta \cdot RxP_n$$

Where $G_n$ represents updated filtered measurement result; $G_{n-1}$ represents old filtered measurement result; $RxP_n$ represents latest received measurement result, and P is the filtering coefficient, in this case an L1 and/or L2 filtering coefficient. L3 filtering may occur when the UE 101 in the ACTIVE or IDLE state. For example, L3 filtering may be done by the formula:

$$F_n = (1-\alpha) \cdot F_{n-1} + \alpha \cdot M_n$$

$F_n$=This is used for measurement reporting and represents the updated filtered measurement result;
$F_{n-1}$=This represents the old filtered measurement result;
M=Latest received measurement result from physical layer; and
$\alpha = \frac{1}{2}^{(k/4)}$ and k is the filter co-efficient for a corresponding measurement quantity received by a quantity configuration parameter. The parameter a is the L3 filtering coefficient.

In general terms, a path loss (PL) estimation of a specific signal may be determined by calculating the difference between a transmission power (TxP) of that signal and a measured received power (RxP) of that signal (e.g., PL=TxP−RxP). More specifically, the path loss estimation at the UE 101 may be determined in various manners depending on various operational factors. By way of example, several example techniques are provided below for estimating path loss at the UE 101:

Example Technique 1-1: Cell-Specific, One Beam

Figure 4:
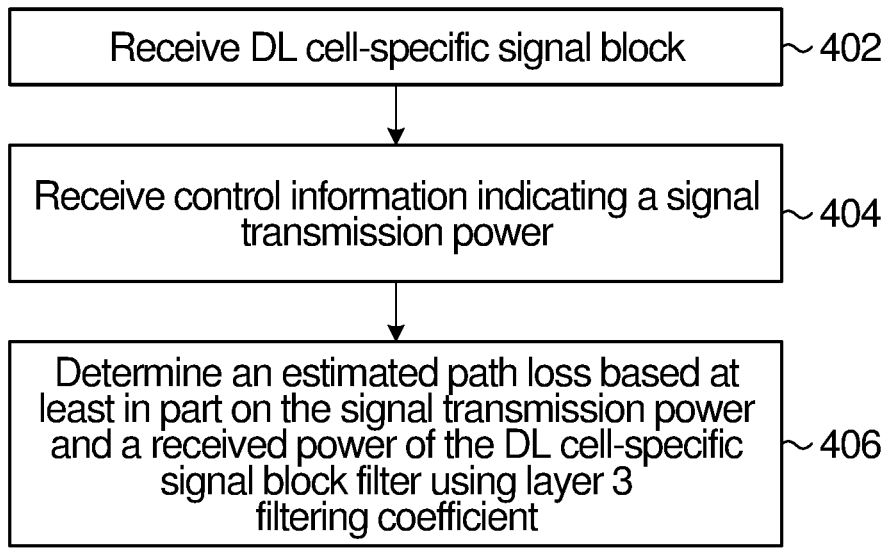
FIGS. 4 to 13 illustrate flowcharts for estimating path loss, in accordance with specific and non-limiting examples of implementation.

Referring to FIG. 4, a process 400 is provided which may be implemented by the UE 101 for estimating path loss in accordance with a specific and non-limiting example of implementation. At step 402, the UE 101 receives a DL cell-specific signal block. The DL cell-specific signal block may include at least one of a synchronization channel, a broadcasting channel demodulation reference signal and a beam identification reference signal. For example, the synchronization channel, the broadcasting channel demodulation reference signal and the beam identification reference signal may be any of the types discussed elsewhere in this document. At step 404, the UE 101 receives control information indicative of a signal transmission power of the DL cell-specific signal block and obtains a layer 3 filtering coefficient. In this example, the signal transmission power of the DL cell-specific signal block and the layer 3 filtering coefficient are provided in the DL communication from the base station BS1. In an alternative embodiment, the layer 3 filtering coefficient may be a default value stored in the memory 2208. At step 406, the UE 101 determines an estimated path loss for the UE based at least in part on the signal transmission power of the DL cell-specific signal block and a received power of the DL cell-specific signal block filtered using the layer 3 filtering coefficient. It is understood that the term "synchronization channel" generally is used interchangeably with the term "synchronization signal" herein, although in some instances they may be used with different scope from each other, as will be evident from the context in which the terms are used.

It should be appreciated that the received power (RxP) is a measured parameter determined by UE 101, and the signal transmission power (TxP) is information transmitted by the base station BS1 and received by the UE 101. The path loss (PL) may be determined according to the following equation: PL=TxP−RxP.

The process 400 may be carried out by the UE 101 while the UE 101 is in the IDLE state.

Example Technique 1-2: Cell-Specific, Multiple Beams

Figure 5:
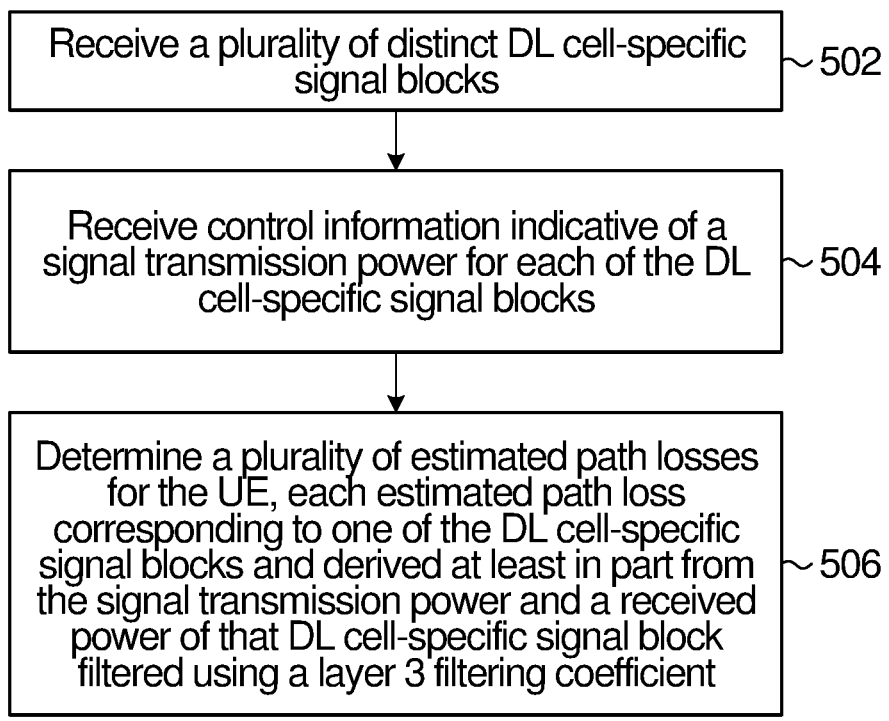

Referring to FIG. 5, a process 500 is provided which may be implemented by the UE 101 for estimating path loss in accordance with a specific and non-limiting example of implementation. At step 502, the UE 101 receives a plurality of distinct DL cell-specific signal blocks. The DL cell-specific signal blocks may be of types discussed elsewhere in this document. For example, each of the distinct DL cell-specific signal blocks may include at least one of a synchronization signal, a broadcasting channel demodulation reference signal and a beam identification reference signal. The plurality of distinct DL cell-specific signal blocks may be the result of multiple transmission and/or reception antenna ports. For instance, each of the received DL cell-specific signal blocks may correspond to a respective beam in a multiple beams transmission from the base station BS1 to the UE 101. Each beam is identified with specific spatial parameters and, as mentioned above, each of the distinct DL cell-specific signal blocks may include one or more reference signals for beam identification.

At step 504, the UE 101 receives control information indicative of a signal transmission power for each of the DL cell-specific signal blocks and obtains a layer 3 filtering coefficient. The control information indicative of a signal transmission power for each of the DL cell-specific signal blocks may be a single value that characterizes the power at which all of the DL cell-specific signal blocks are transmitted or may be respective signal transmission power values at which each of the DL cell-specific signal blocks is respectively transmitted. At step 506, the UE 101 determines a plurality of estimated path losses for the UE 101, each estimated path loss corresponding to one of the DL cell-specific signal blocks and derived at least in part from the signal transmission power and a received power of that DL cell-specific signal block filtered using the same layer 3 filtering coefficient. Generally, the signal transmission power of the DL cell-specific signal block and the layer 3 filtering coefficient can be indicated to the UE within the same or different control signaling. In an alternative embodiment, the layer 3 filtering coefficient may be a default value stored in the memory 2208.

The process 500 may also include the step (not shown) of the UE 101 estimating one path loss based at least in part on a plurality of distinct DL cell-specific signal blocks as the estimated path loss for the UE. For instance, a suitable combining technique may be used to determine the estimated path loss for the UE (e.g., equal gain combining, maximal ratio combining, selection combining, averaging, filtering, etc.). For example, the equal gain combining (or averaging) may refer to determining pathloss based on combining all distinct DL cell-specific signal blocks with one gain/weight factor. The maximal ratio combining may refer to determining pathloss based on combining all distinct DL cell-specific signal blocks with different gain/weight factors. The selection combining may refer to the receiver at the UE switching to another signal when the currently selected signal drops below a predefined threshold. This may also be referred to as "Scanning Combining". The filtering may refer to determining pathloss based on passing at least one of all distinct DL cell-specific signal blocks with one passing rule.

Figure 16:
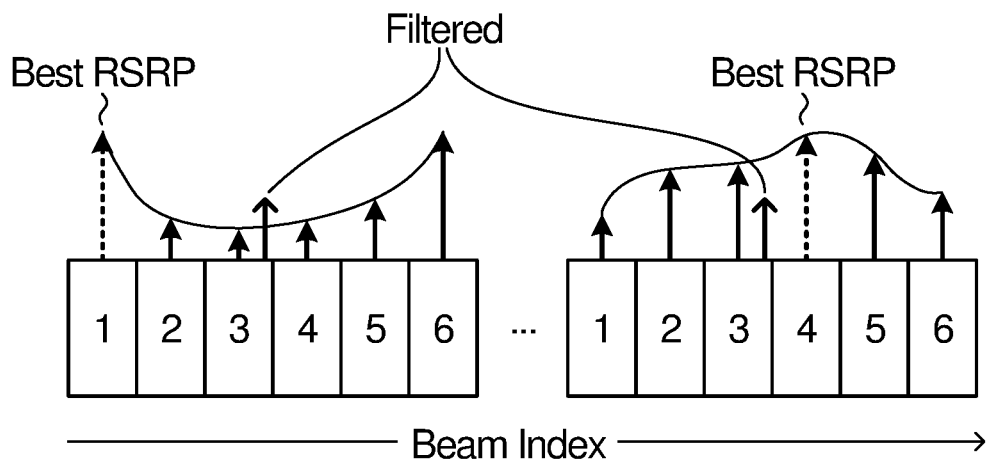
FIGS. 16 and 17 illustrate received powers for reference signals corresponding to respective beams, in accordance with specific and non-limiting examples.
Figure 16:
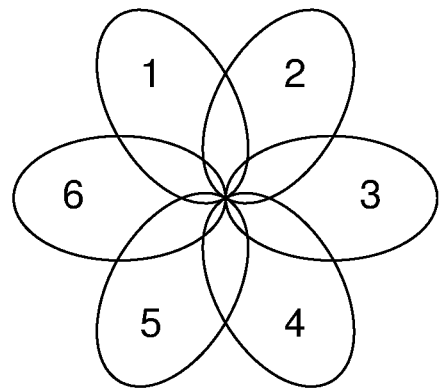

By way of a specific and non-limiting example, and with additional reference to FIG. 16, the respective received power of six beams can be filtered to determine the specific RxP for use in determining the estimated path loss for the UE.

The process 500 may also include the step (not shown) of the UE 101 selecting one particular estimated path loss from the plurality of estimated path losses as the estimated path loss for the UE. For example, as shown in FIG. 16, the UE 101 may select the path loss corresponding to the beam with the highest received power (RxP).

The process 500 may be carried out by the UE 101 while the UE 101 is in the IDLE state. Alternatively or in addition, the process 500 may be carried out by the UE 101 while the UE 101 is in the ACTIVE state.

Example Technique 1-3a: Cell-Specific, One Beam, Single PL

Figure 6:
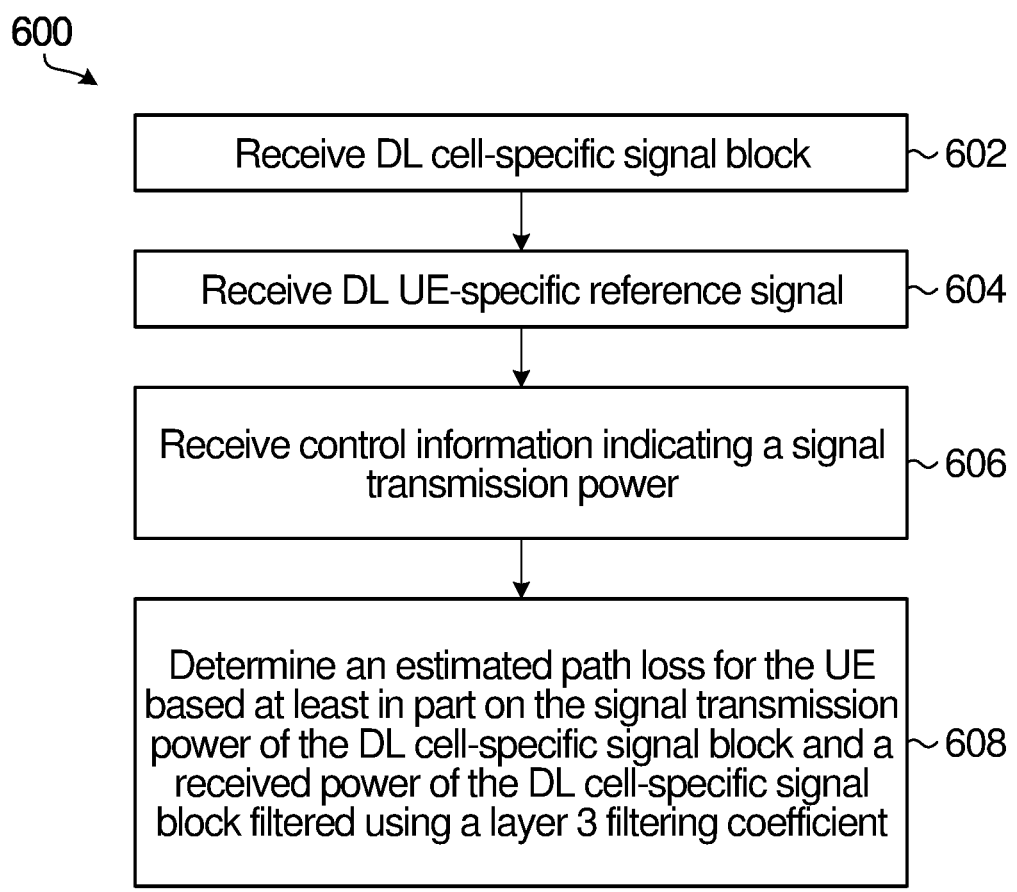

Referring to FIG. 6, a process 600 is provided which may be implemented by the UE 101 for estimating path loss in accordance with a specific and non-limiting example of implementation. At step 602, the UE 101 receives a DL cell-specific signal block. The DL cell-specific signal block may be of the type discussed elsewhere in this document. For example, the DL cell-specific signal block may include at least one of a synchronization signal, a broadcasting channel demodulation reference signal and a beam identification reference signal. For instance, the DL cell-specific signal block at step 602 may be of the type specified at step 402 of process 400.

At step 604, the UE 101 receives at least one DL UE-specific reference signal. The DL UE-specific reference signal may be of the type discussed elsewhere in this document. For instance, the UE-specific reference signal may include signals specific for the UE 101.

At step 606, the UE 101 receives control information indicative of a signal transmission power of the DL cell-specific signal block and a layer 3 filtering coefficient. The control information and the layer 3 filtering coefficient may be as discussed elsewhere in this document. Generally, the signal transmission power of the DL cell-specific signal block and the layer 3 filtering coefficient can be indicated to the UE within the same or different control signaling. For instance, the control information and the layer 3 filtering coefficient may be as specified at step 404 of process 400. In an alternative embodiment, the layer 3 filtering coefficient may be a default value stored in the memory 2208.

At step 608, the UE 101 determines an estimated path loss for the UE 101 based at least in part on the signal transmission power of the DL cell-specific signal block and a received power of the DL cell-specific signal block filtered using the layer 3 filtering coefficient. It should be appreciated that a consequence of step 608 is that the estimated path loss for the UE 101 may be determined without any regard to (i.e., not based on) any of the at least one DL UE-specific reference signals. In other words, although the UE 101 may have been able to use the at least one DL UE-specific reference signal in the path loss estimation, the UE 101 is purposely configured to estimate the path loss without regard to any of the at least one DL UE-specific reference signals. It should further be appreciated that UEs have not conventionally used DL cell-specific signal blocks for path loss estimation in the ACTIVE state but rather used a DL UE-specific reference signal for path loss estimation and that by configuring the UE 101 to use the DL cell-specific signal blocks for path loss estimation without any regard to the DL UE-specific reference signals, that this may allow for a more accurate path loss estimation when the UE 101 is in the ACTIVE state. Note that although the DL UE-specific reference signal(s) is(are) not used in path loss estimation, it(they) may be used for other purposes.

It should be appreciated that process 600 may be a specific and non-limiting example of implementation of process 400. For instance, process 600 may be an implementation of process 400 when the UE 101 is in the ACTIVE state, during which it receives at least one DL UE-specific reference signal.

Example Technique 1-3b: Cell-Specific, Multiple Beams, Multiple PL

Figure 7:
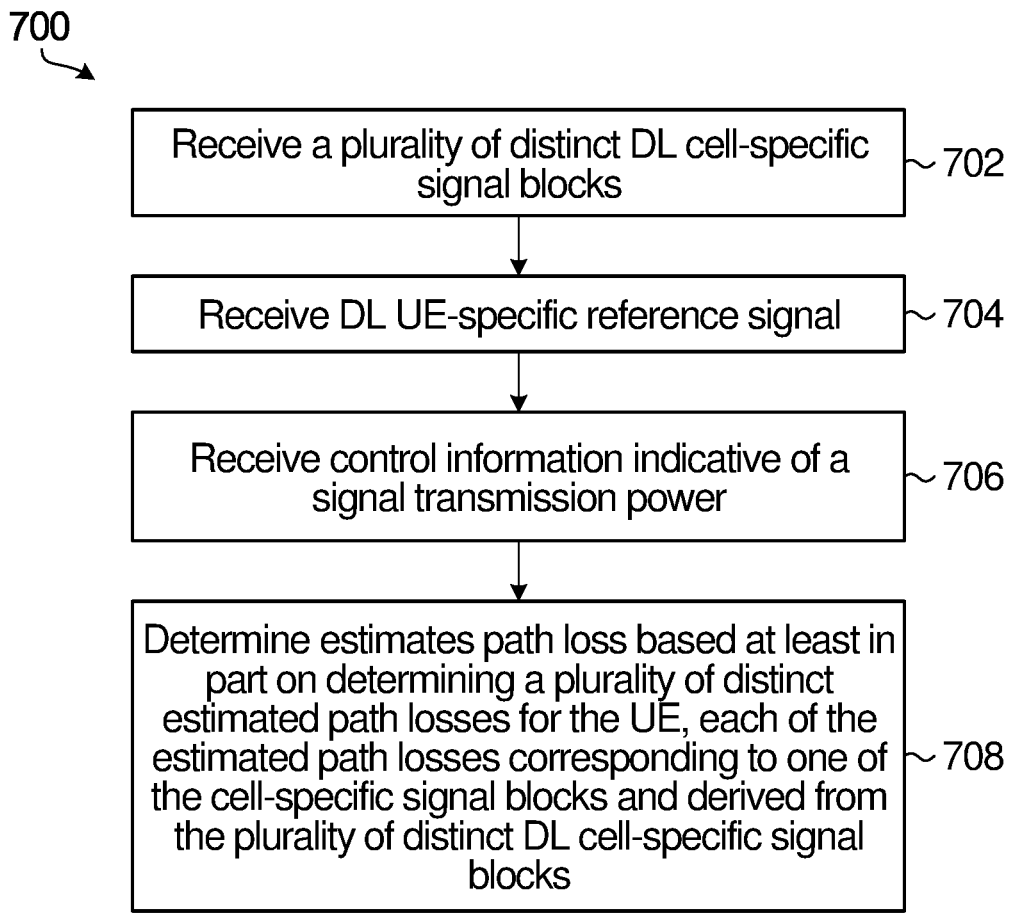

Referring to FIG. 7, a process 700 is provided which may be implemented by the UE 101 for estimating path loss in accordance with a specific and non-limiting example of implementation. At step 702, the UE 101 receives a plurality of distinct DL cell-specific signal blocks. The plurality of DL cell-specific signal blocks may be as discussed elsewhere in this document, for example, as discussed at step 502 of process 500. At step 704, the UE 101 receives a DL UE-specific reference signal. At step 706, the UE 101 receives control information indicative of a signal transmission power for each of the DL cell-specific signal blocks and a layer 3 filtering coefficient. In an alternative embodiment, the layer 3 filtering coefficient may be a default value stored in the memory 2208. The control information may be as discussed elsewhere in this document, for example, as discussed at step 504 of process 500. At step 708, the UE 101 determines an estimated path loss for the UE 101 based at least in part on determining a plurality of distinct estimated path losses for the UE, each of the estimated path losses corresponding to a respective one of the cell-specific signal blocks and derived from the plurality of distinct DL cell-specific signal blocks. It should be appreciated that a consequence of step 708 is that the UE 101 may determine the estimated path loss for the UE 101 not from the at least one DL UE-specific reference signal. For instance, each of the estimated path loss corresponding to one of the DL cell-specific signal blocks may be derived at least in part from the signal transmission power and a received power of that DL cell-specific signal block filtered using the layer 3 filtering coefficient, without regard to (i.e., not based on) the at least one DL UE-specific reference signal. In other words, whereas the UE 101 may have been able to use the at least one DL UE-specific reference signal in the path loss estimation, it is purposely configured to estimate the path loss without regard to any of the at least one DL UE-specific reference signals. It should further be appreciated that UEs have not conventionally used DL cell-specific signal blocks for path loss estimation in the ACTIVE state but rather used a DL UE-specific reference signal for path loss estimation and that by configuring the UE 101 to use the DL cell-specific signal blocks for path loss estimation without any regard to the DL UE-specific reference signals, that this may allow for a more accurate path loss estimation when the UE 101 is in the ACTIVE state.

Figure 17:
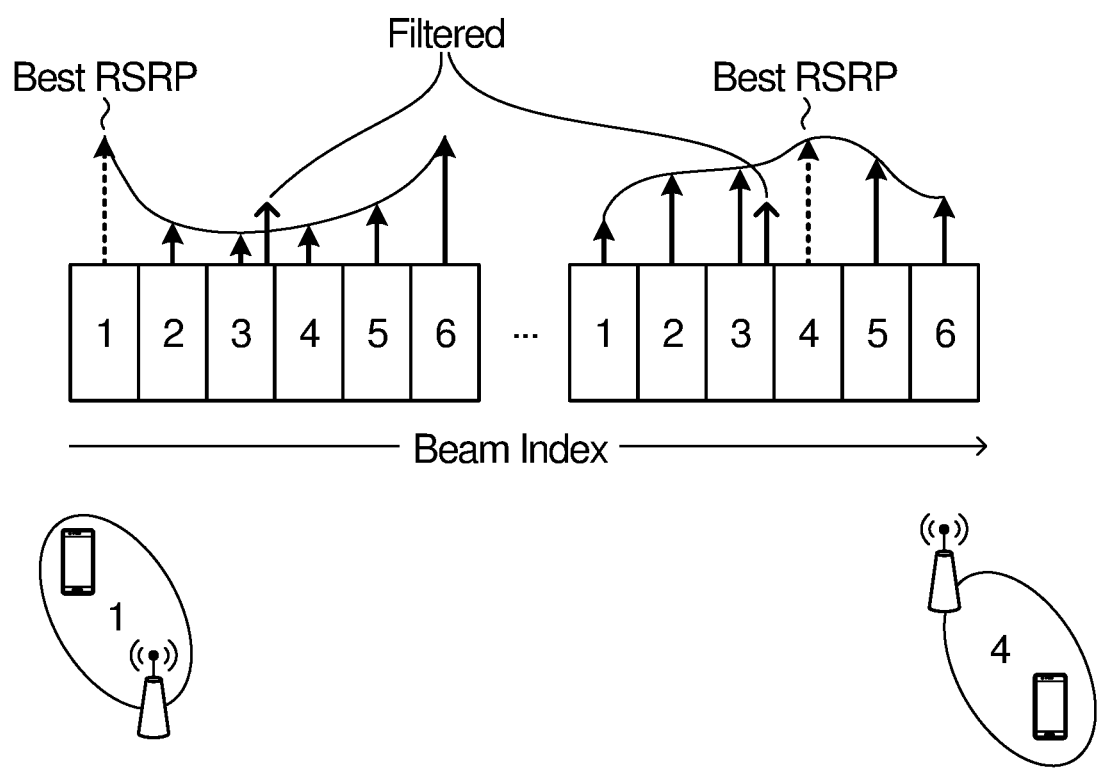

The process 700 may also include the step (not shown) of the UE 101 receiving an indication signaling for path loss selection, and selecting a particular one of the estimated path losses according to the indication signaling. By way of a specific and non-limiting example, and with additional reference to FIG. 17, the indication signaling for path loss selection may corresponding to a particular beam, which is illustrated in FIG. 17 as Beam 1 for a first UE and Beam 4 for a second UE.

It should be appreciated that process 700 may be a specific and non-limiting example of implementation of process 500. For instance, process 700 may be an implementation of process 500 when the UE 101 is in the ACTIVE state, during which it receives at least one DL UE-specific reference signal.

Example Technique 2-1: UE-Specific, One RS, L1 or L2

Figure 8:
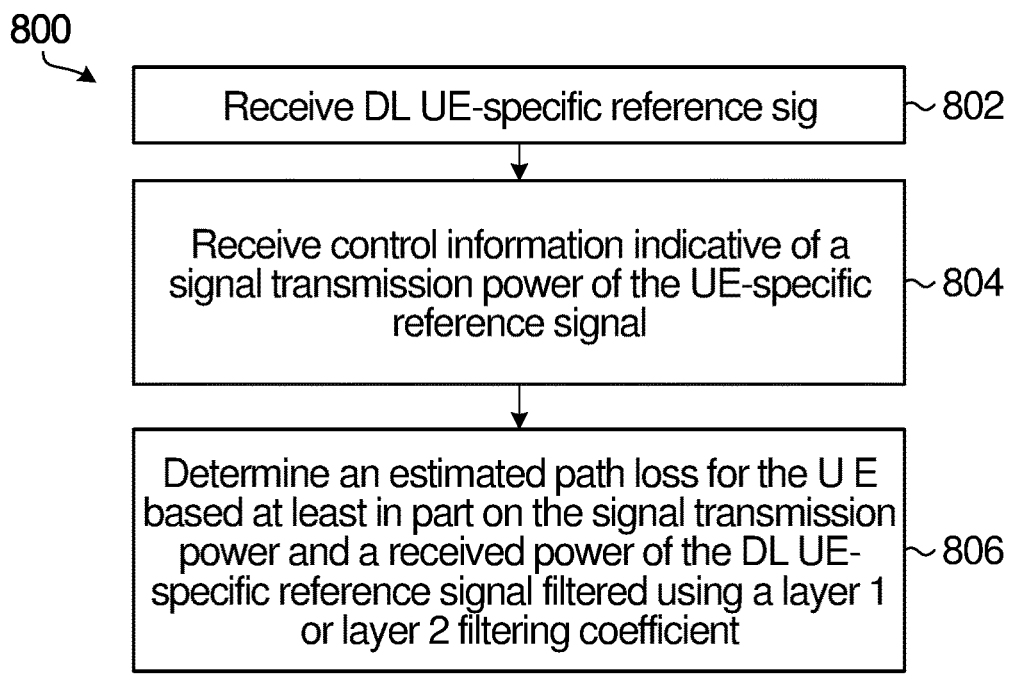

Referring to FIG. 8, a process 800 is provided which may be implemented by the UE 101 for estimating path loss in accordance with a specific and non-limiting example of implementation. At step 802, the UE 101 receives a DL UE-specific reference signal. At step 804, the UE 101 receives control information indicative of a signal transmission power of the UE-specific reference signal and obtains a layer 1 or layer 2 filtering coefficient. In an alternative embodiment, the layer 1 or layer 2 filtering coefficient(s) may be default value(s) stored in the memory 2208. At step 806, the UE 101 determines an estimated path loss for the UE based at least in part on the signal transmission power and a received power of the DL UE-specific reference signal filtered using the layer 1 or layer 2 filtering coefficient. Generally, the signal transmission power of the UE-specific reference signal and the layer 1 or layer 2 filtering coefficient can be indicated to the UE within the same or different control signaling.

Figure 18:
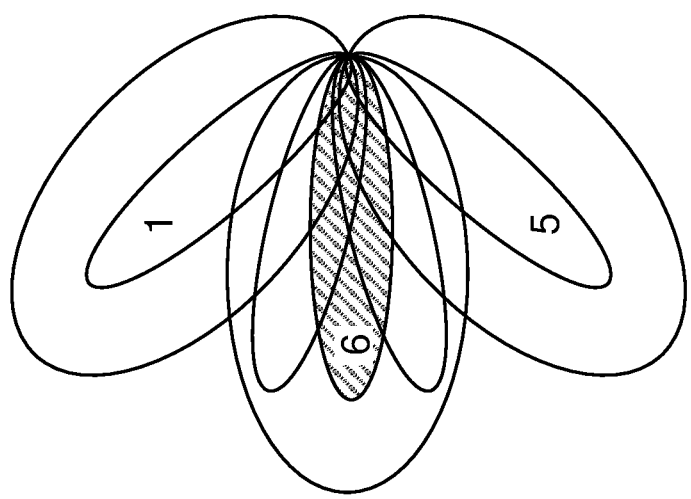

By way of a specific and non-limiting example, and with additional reference to FIG. 18, illustrates a specific DL UE-specific reference signal in set of reference signals in particular beam (i.e., Beam 6) that is used to determine the estimated path loss for the UE.

The DL UE-specific reference signal, the control information, the signal transmission power, the filtering coefficient, may be as discussed elsewhere in this document.

It should be appreciated that by L1 or L2 filtering (i.e., non-L3 filtering) that the processes for determining the received power may be shorter in comparison to determining the received power when L3 filtering is done.

Example Technique 2-2: UE-Specific, Multiple RS, L1 or L2

Figure 9:
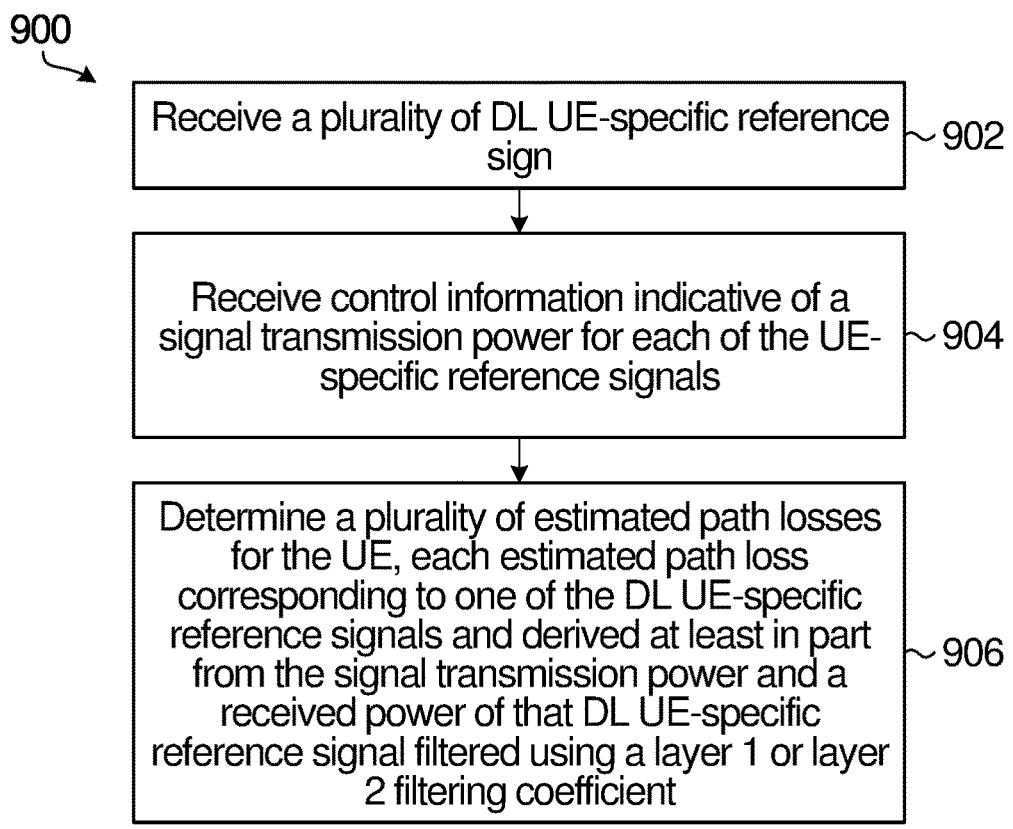

Referring to FIG. 9, a process 900 is provided which may be implemented by the UE 101 for estimating path loss in accordance with a specific and non-limiting example of implementation. At step 902, the UE 101 receives a plurality of distinct DL UE-specific reference signals. At step 904, the UE 101 receives control information indicative of a signal transmission power for each of the DL UE-specific reference signals and a layer 1 or layer 2 filtering coefficient. The control information indicative of a signal transmission power for each of the DL UE-specific reference signal may be a common signal transmission value that characterizes the transmission power of all of the DL UE-specific reference signals or may be a plurality of respective signal transmission power values that characterizes the transmission power of respective ones of the DL UE-specific reference signals. At step 906, the UE 101 determines a plurality of estimated path losses for the UE, each estimated path loss corresponding to one of the DL UE-specific reference signals and derived at least in part from the signal transmission power and a received power of that DL UE-specific reference signal filtered using the same layer 1 or layer 2 filtering coefficient. Generally, the signal transmission power of the UE-specific reference signal and the layer 1 or layer 2 filtering coefficient can be indicated to the UE within the same or different control signaling. In an alternative embodiment, the layer 1 or layer 2 filtering coefficient(s) may be default value(s) stored in the memory 2208.

Figure 19:
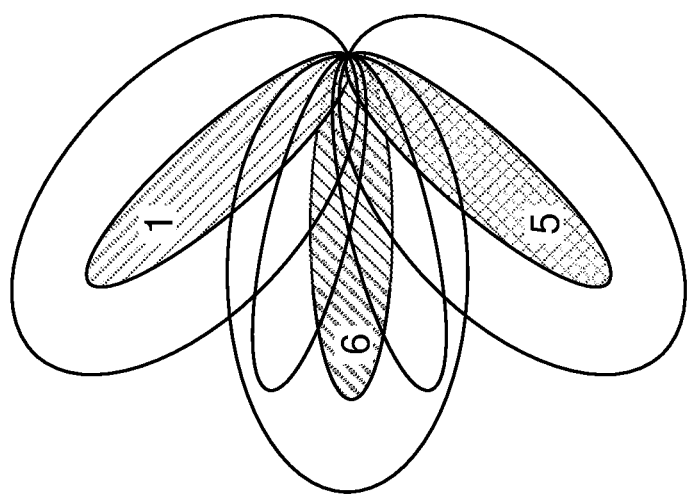

By way of a specific and non-limiting example, and with additional reference to FIG. 19, illustrates multiple DL UE-specific reference signals in different beams (i.e., Beam 1, 5 and 6) that are used to determine the estimated path loss for the UE.

The DL UE-specific reference signal, the control information, the signal transmission power, the filtering coefficient, may be as specified elsewhere in this document.

The process 900 may also include the step (not shown) of the UE 101 receiving an indication signaling for path loss selection and selecting a particular one of the estimated path losses according to the indication signaling. For instance, the base station BS1 may provide the indication signaling for path loss selection and specify to select a particular estimated path loss that corresponds with a particular reference signal.

Example Technique 2-3: UE-Specific, Multiple RS Set, L1 or L2

Figure 10:
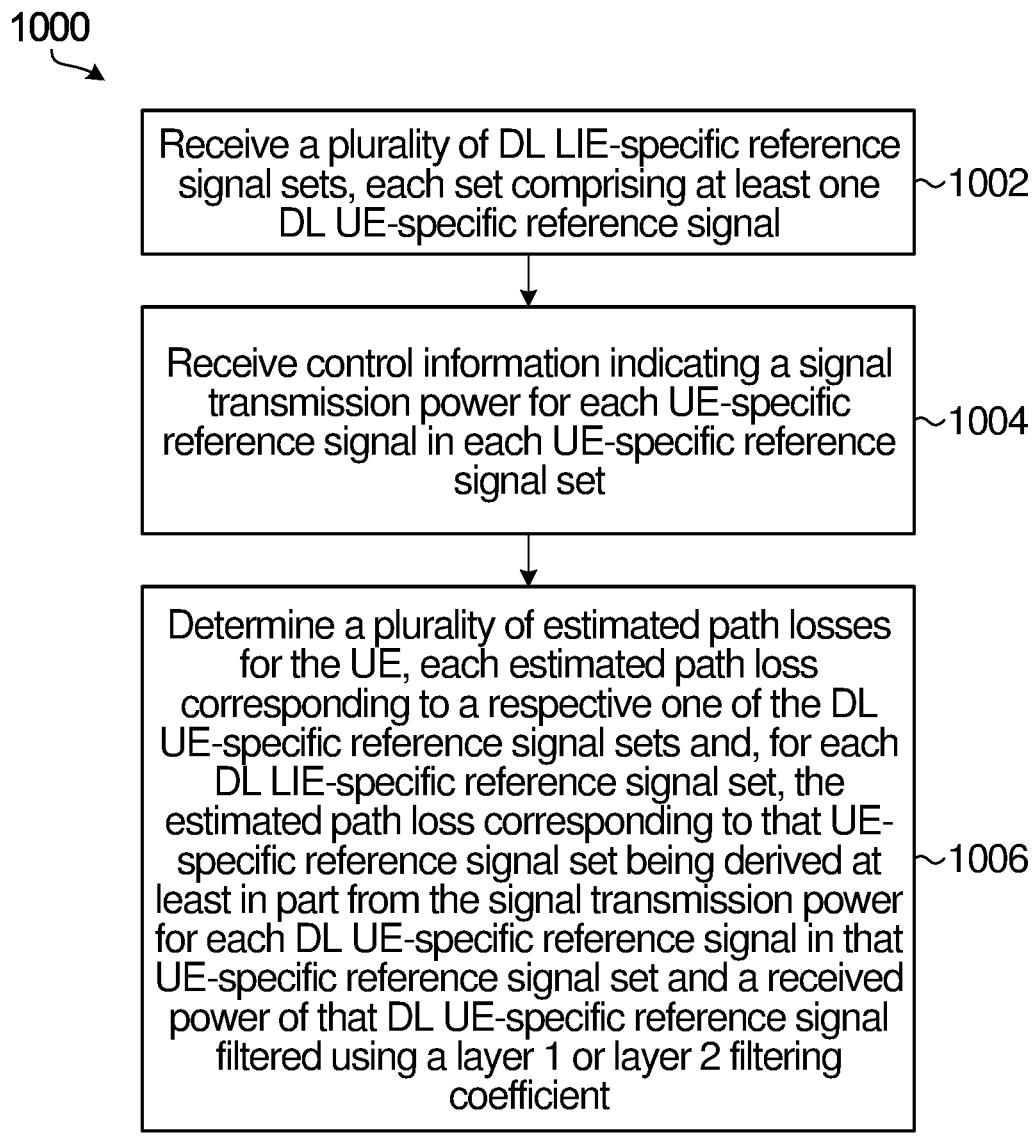

Referring to FIG. 10, a process 1000 is provided which may be implemented by the UE 101 for estimating path loss in accordance with a specific and non-limiting example of implementation. At step 1002, the UE 101 receives a plurality of distinct DL UE-specific reference signal sets, each set includes at least one DL UE-specific reference signal. Each set may include signals that correspond to a specific transmission beam and may be used for beam identification (as discussed elsewhere in this document). At step 1004, the UE 101 receives control information indicating a signal transmission power for each UE-specific reference signal in each UE-specific reference signal set and a layer 1 or layer 2 filtering coefficient. In an alternative embodiment, the layer 1 or layer 2 filtering coefficient(s) may be default value(s) stored in the memory 2208.

At step 1006, the UE 101 determines a plurality of estimated path losses for the UE, each estimated path loss corresponding to a respective one of the DL UE-specific reference signal sets and, for each DL UE-specific reference signal set, the estimated path loss corresponding to that UE-specific reference signal set being derived at least in part from the signal transmission power for each DL UE-specific reference signal in that UE-specific reference signal set and a received power of that DL UE-specific reference signal filtered using the same layer 1 or layer 2 filtering coefficient. Generally, the signal transmission power of the UE-specific reference signal and the layer 1 or layer 2 filtering coefficient can be indicated to the UE within the same or different control signaling.

Figure 20:
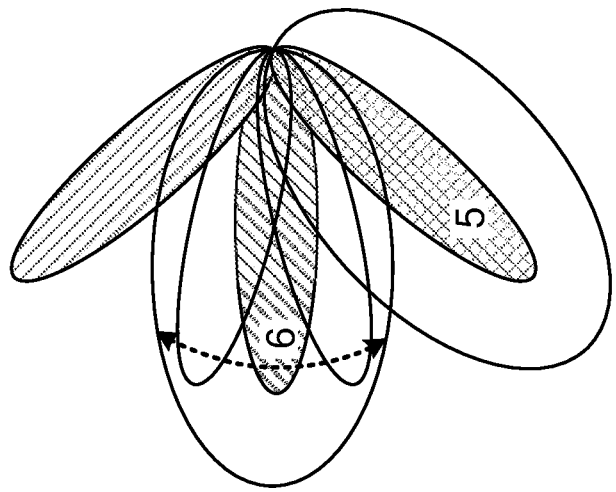
FIGS. 18 to 20 illustrate the use of reference signals for beam identification measurements, in accordance with specific and non-limiting examples.

By way of a specific and non-limiting example, and with additional reference to FIG. 20, illustrates in Beam 6 a plurality of DL UE-specific reference signals in its set and in Beam 5 a signal reference signal in its set, which may be used to determine the estimated path loss for the UE.

The DL UE-specific reference signal sets, DL UE-specific reference signals, the control information, the signal transmission power, the filtering coefficient, may be as discussed elsewhere in this document.

The process 1000 may also include the step (not shown) of the UE 101 receiving indication signaling for path loss selection and selecting a particular one of the estimated path losses according to the indication signaling.

Example Technique 2-4: Selection

The processes 800, 900 and 1000 may be implemented by the UE 101 for estimating path loss, and a selection of one of the estimated path losses may be made. The base station BS1 may provide control information to the UE 101 for the selection of one of the processes 800, 900 and 1000 for use in deriving the estimated path loss. The control information may be provided using indication signaling, which can be one of more of dynamic control information, semi-static/RRC (radio resource control) signaling and MAC control element (CE).

Example Technique 3a: Cell-Specific and UE-Specific, RS Set

Figure 11:
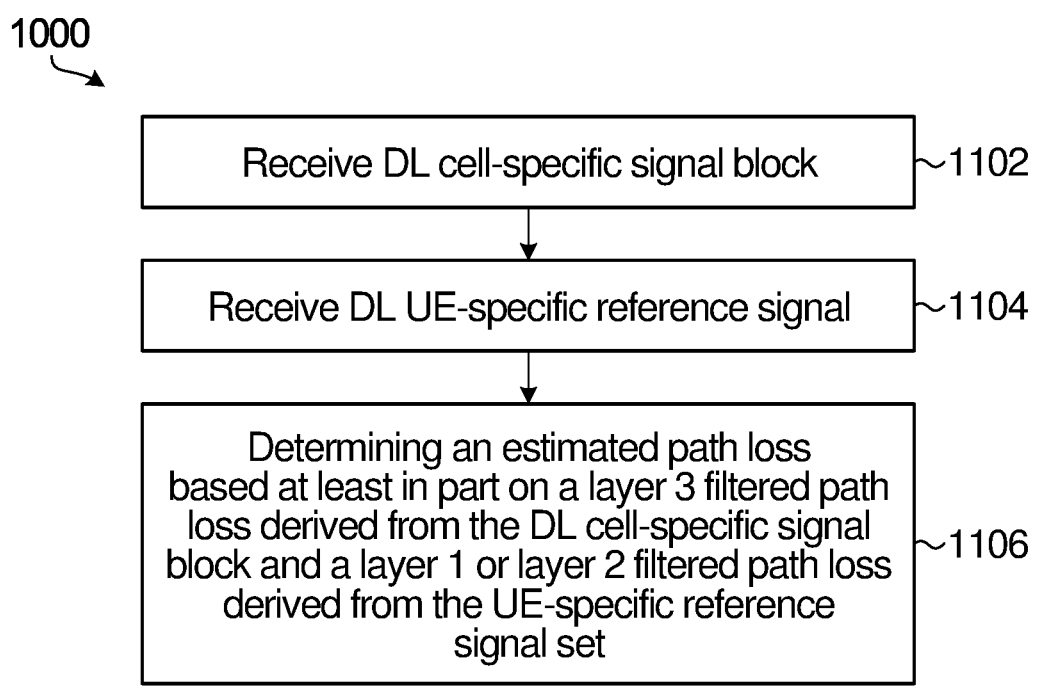

Referring to FIG. 11, a process 1100 is provided which may be implemented by the UE 101 for estimating path loss in accordance with a specific and non-limiting example of implementation. At step 1102, the UE 101 receives a DL cell-specific signal block. At step 1102, the UE 101 may also receive a layer 3 filtering coefficient. At step 1104, the UE 101 receives a UE-specific reference signal set. At step 1104, the UE 101 may also receive a layer 1 and/or layer 2 filtering coefficient. The receipt of the layer 3 and/or layer 1 and/or layer 2 filtering coefficients may be part of a separate step in the process 1100 and, in some embodiments, may involve receiving control information from the base station. In alternative embodiments, the UE may consult default values stored in the memory 2208 without base station involvement. At step 1106, the UE 101 determines an estimated path loss based at least in part on a first filtered path loss derived from the DL cell-specific signal block filtered using the layer 3 filtering coefficient and a second filtered path loss derived from the UE-specific reference signal set filtered with the layer 1 or layer 2 filtering coefficient. It should be appreciated that at step 1106, the UE 101 may calculate only one path loss based on both a DL cell-specific signal block and a UE-specific reference signal set. For example, the path loss (PL) may be determined as:

$$PL=(1-\beta)\cdot PL_{cell\text{-}specific}+\beta\cdot PL_{ue\text{-}specific}$$

Where $PL_{cell\text{-}specific}$ represents PL estimation based on cell-specific signal block; $PL_{ue\text{-}specific}$ represents PL estimation based on one UE-specific reference signal, P is the L1 or L2 filtering coefficient (as discussed elsewhere in this document).

The process 1100 may also include the step (not shown) of the UE 101 receiving control signaling for path loss selection and apportioning determination of the estimated path loss between the first (layer 3 filtered) path loss and the second (layer 1 or layer 2) filtered path loss according to the control signaling. The control information may be provided using indication signaling, which can be one or more of dynamic control information, semi-static/RRC signaling and MAC CE. It should be appreciated that the process 1100 is a hybrid approach and may include aspects of the other processes discussed elsewhere in this document for estimating path loss.

Example Technique 3b: Cell-Specific and UE-Specific, RS

Figure 12:
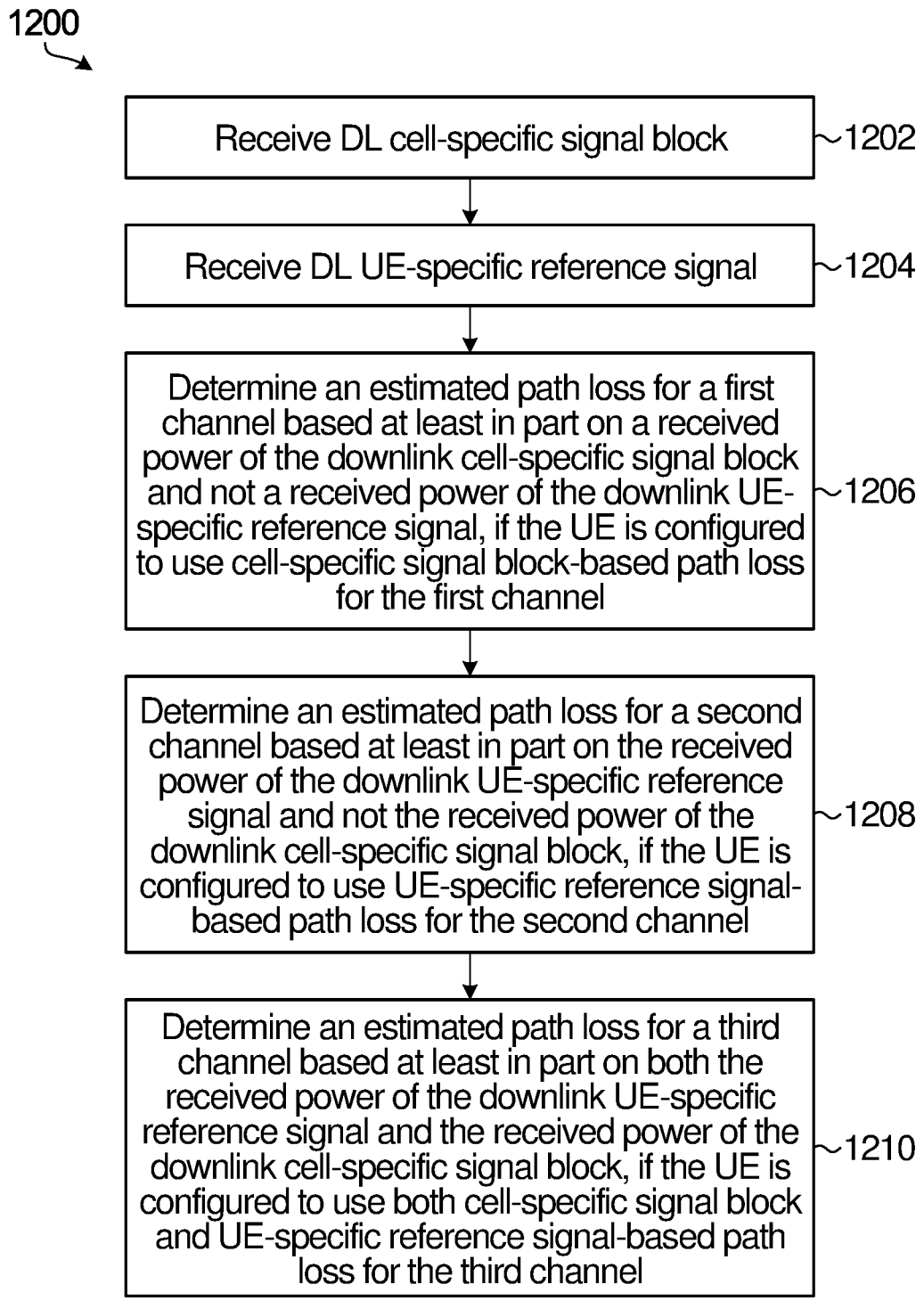

Referring to FIG. 12, a process 1200 is provided which may be implemented by the UE 101 for estimating path loss in accordance with a specific and non-limiting example of implementation. At step 1202, the UE 101 receives a DL cell-specific signal block and a L3 filter coefficient. At step 1204, the UE 101 receives a DL UE-specific reference signal and a L1 or L2 filtering coefficient. The receipt of the L3 and/or L1 or L2 filtering coefficients may be part of separate step in the process 1200. The L3 and/or L1 or L2 filtering coefficients may be received from the base station. In some embodiments, the UE may obtain the filtering coefficients by consulting default values stored in the memory 2208 without base station involvement. If UE 101 is configured so that only cell-specific signal based path loss is used for a first channel, e.g., Physical Random Access Channel (PRACH), then at step 1206, the UE 101 determines an estimated path loss for the first channel based at least in part on a received power of the DL cell-specific signal block and not a received power of the DL UE-specific reference signal. At step 1206, the path loss estimation may include filtering the received power of the DL cell-specific signal block with the L3 filtering coefficient. If UE 101 is configured that only UE-specific reference signal based path loss is used for a second channel, e.g., Physical Uplink Shared Channel (PUSCH), then at step 1208, the UE 101 determines an estimated path loss for the second channel based at least in part on the received power of the DL UE-specific reference signal and not the received power of the DL cell-specific signal block.

At step 1208, the path loss estimation may include filtering the received power of the DL UE-specific reference signal with the L1 or L2 filtering coefficient. Alternatively, at step 1208, the path loss estimation also may include filtering the received power of the DL UE-specific reference signal with the L3 filtering coefficient. If the UE 101 is configured so that both cell-specific signal block-based and UE-specific reference signal-based path loss is used for a third channel (e.g. PUSCH), then at step 1210, the UE 101 determines an estimated hybrid path loss based at least in part on both the received power of the DL UE-specific reference signal and the received power of the DL cell-specific signal block. In this way, different reference signals may be used for different channels to conduct path loss estimation by the UE 101. Generally, different channel for uplink transmission can be at least one of PUSCH, PUCCH (Physical Uplink Control Channel), PRACH. Moreover the configuration of RS for path loss estimation can be at least one of predefinition, semi-static/RRC signaling, dynamic control information and MAC CE.

Example Technique 4: INACTIVE State

In the following technique, reference will be made to the INACTIVE state, which is a third state that is different from the IDLE state. The INACTIVE state may be considered a mid-state between the IDLE and ACTIVE state. In the INACTIVE state, the UE 101 may not maintain an active connection with the base station BS1. In the INACTIVE state, which is entered by the UE 101 from the ACTIVE state, certain residual information from the ACTIVE is preserved (stored), which information is not available in the IDLE state. For example, this may include a path loss which would have been determined while the UE 101 was in the ACTIVE state. The INACTIVE state may also be referred to as a "RAN (Radio Access Network) controlled state". In practical implementations, the UE 101 may have one or more of the following characteristics in the INACTIVE state:

- a CN (Core Network) connection or RAN connection is maintained;
- AS (access stratum) context is stored in RAN;
- the network knows the UE's location within an area and the UE performs mobility within that area without notifying the network;
- RAN can trigger paging of UEs which are in the RAN controlled INACTIVE state;
- no dedicated resources are maintained.

Figure 13:
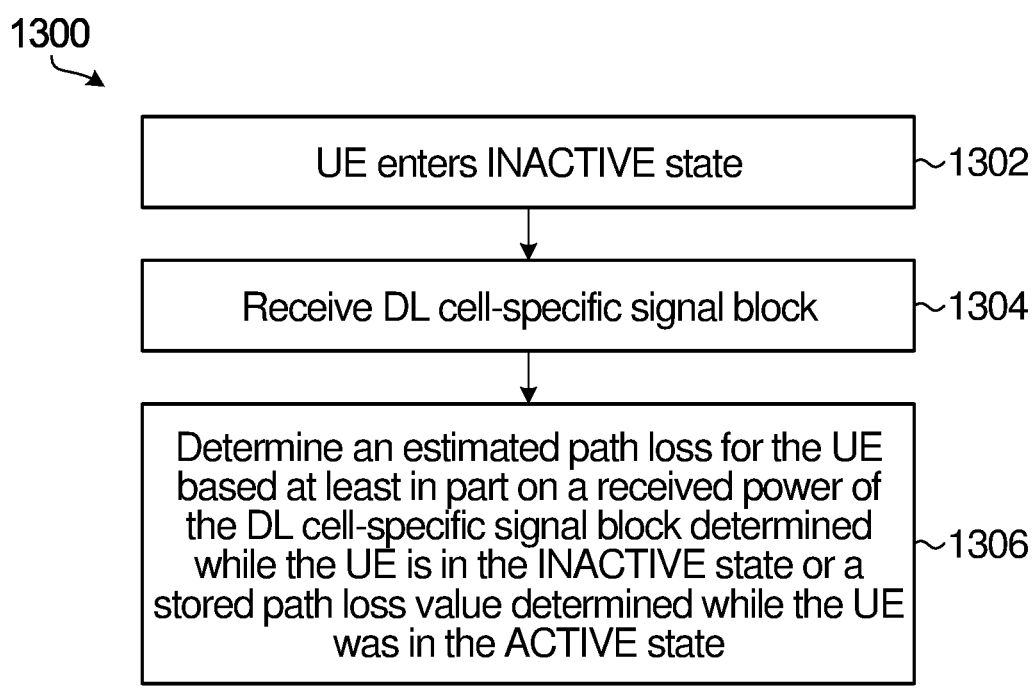

Referring to FIG. 13, a process 1300 is provided which may be implemented by the UE 101 for estimating path loss in accordance with a specific and non-limiting example of implementation. At step 1302, the UE 101 enters an "INACTIVE" state from the ACTIVE state, the INACTIVE state. At step 1304, the UE 101 receives a DL cell-specific signal block. At step 1306, the UE 101 estimates path loss for the UE 101 based at least in part on a received power of the DL cell-specific signal block determined while the UE 101 is in the INACTIVE state or a stored path loss value determined while the UE 101 was in the ACTIVE state. Moreover, the stored path loss refers to the path loss which is estimated by the configuration of at least one of DL cell-specific signal block and UE-specific reference signal in the ACTIVE state, for example as determined in any of the processes 400, 500, . . . , 1100, 1200 described above.

The process 1300 may also include the step (not shown) of the UE 101 receiving a layer 3 filtering coefficient during the inactive state; determining the received power of the DL cell-specific signal block during the inactive state; and filtering the received power of the DL cell-specific signal block using the layer 3 filtering coefficient to determine the estimated path loss for the UE during the inactive state.

As noted elsewhere in this document, the nomenclature of the various states may differ in practical implementations and as such the state names are provided for example purposes.

Figure 21:
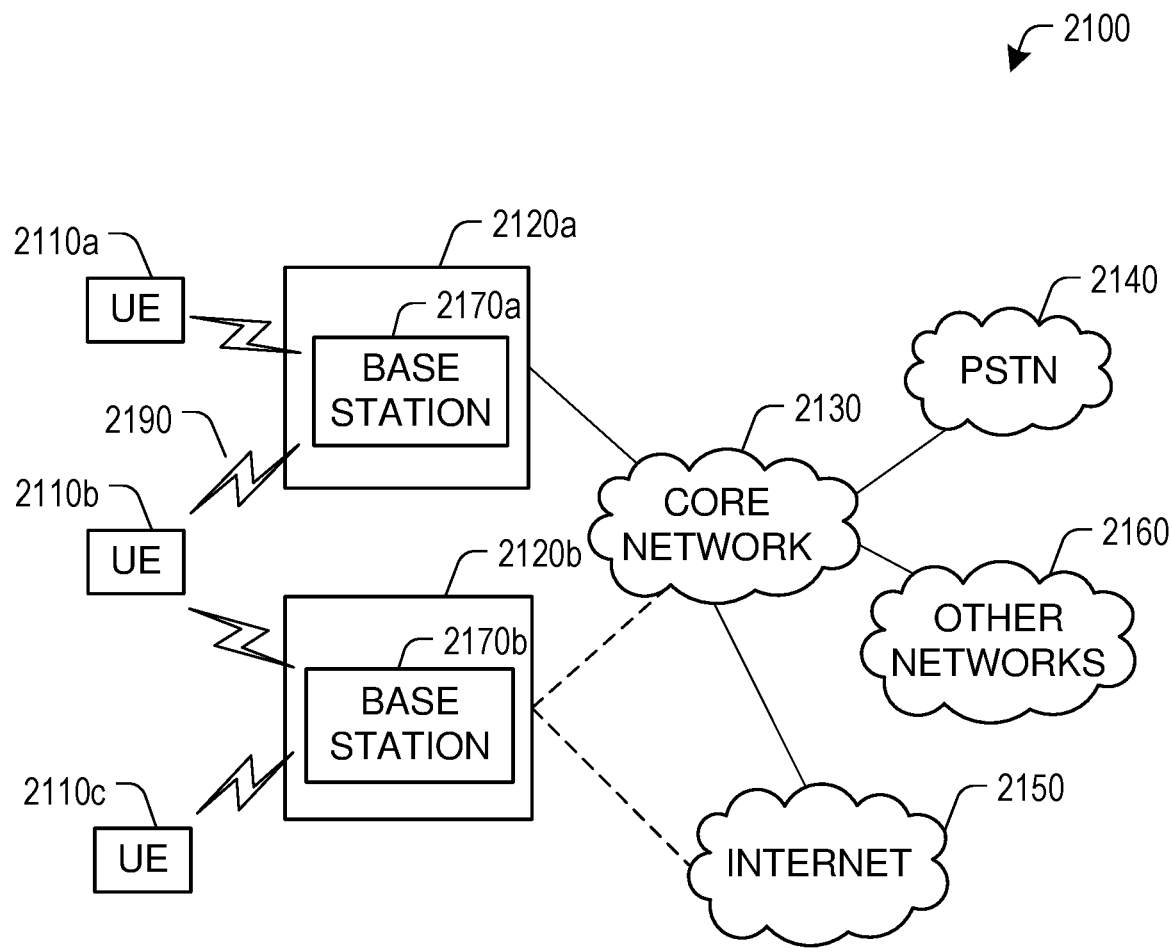
FIG. 21 is a network diagram of a communication system.

FIG. 21 illustrates an example communication system 2100 in which embodiments of the present disclosure could be implemented. In general, the communication system 2100 enables multiple wireless or wired elements to communicate data and other content. The purpose of the communication system 2100 may be to provide content (voice, data, video, text) via broadcast, narrowcast, user device to user device, etc. The communication system 2100 may operate by sharing resources such as bandwidth.

In this example, the communication system 2100 includes electronic devices (also referred to as user equipment (UE)) 2110a-2110c, radio access networks (RANs) 2120a-2120b, a core network 2130, a public switched telephone network (PSTN) 2140, the internet 2150, and other networks 2160. Although certain numbers of these components or elements are shown in FIG. 21, any reasonable number of these components or elements may be included in the communication system 2100.

The UEs 2110a-2110c are configured to operate, communicate, or both, in the communication system 2100. For example, the UEs 2110a-2110c are configured to transmit, receive, or both via wireless or wired communication channels. Each UE 2110a-2110c represents any suitable end user device for wireless operation and may include or be referred to as a wireless transmit/receive unit (WTRU), mobile station, fixed or mobile subscriber unit, cellular telephone, station (STA), machine type communication (MTC) device, personal digital assistant (PDA), smartphone, laptop, computer, tablet, phablet, wireless sensor, or consumer electronics device.

In FIG. 21, the RANs 2120a-2120b include base stations 2170a-2170b, respectively. Each base station 2170a-2170b is configured to wirelessly interface with one or more of the UEs 2110a-2110C to enable access to any other base station 2170a-2170b, the core network 2130, the PSTN 2140, the internet 2150, and/or the other networks 2160. For example, the base stations 2170a-2170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any UE 2110a-2110 may be alternatively or additionally configured to interface, access, or communicate with any other base station 2170a-2170b, the internet 2150, the core network 2130, the PSTN 2140, the other networks 2160, or any combination of the preceding. The communication system 2100 may include RANs, such as RAN 2120b, wherein the corresponding base station 2170b accesses the core network 2130 via the internet 2150, as shown. It is understood that the radio access network 100 in FIG. 1 could be one of the RANs 2120a-2120b, the base station BS1 in FIG. 1 could be one of the base stations 2170a-2170b, the core network in FIG. 1 may be the core network 2130, and the UE in FIG. 1 may be any one of the UEs 2110a-2110c.

The UEs 2110a-2110c and base stations 2170a-2170b are examples of communication equipment that can be configured to implement some or all of the functionality and/or embodiments described herein. In the embodiment shown in FIG. 21, the base station 2170a forms part of the RAN 2120a, which may include other base stations, base station controller(s) (BSC), radio network controller(s) (RNC), relay nodes, elements, and/or devices. Any base station 2170a, 2170b may be a single element, as shown, or multiple elements, distributed in the corresponding RAN, or otherwise. Also, the base station 2170b forms part of the RAN 2120b, which may include other base stations, elements, and/or devices. Each base station 2170a-2170b transmits and/or receives wireless signals within a particular geographic region or area, sometimes referred to as a "cell" or "coverage area". A cell may be further divided into cell sectors, and a base station 2170a-2170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 2120a-2120b shown is exemplary only. Any number of RAN may be contemplated when devising the communication system 2100.

The base stations 2170a-2170b communicate with one or more of the UEs 2110a-2110c over one or more air interfaces 2190 using wireless communication links e.g. radio frequency (RF), microwave, infrared (IR), etc. The air interfaces 2190 may utilize any suitable radio access technology. For example, the communication system 2100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 2190.

A base station 2170a-2170b may implement Universal Mobile Telecommunication System (UMTS) Terrestrial Radio Access (UTRA) to establish an air interface 2190 using wideband CDMA (WCDMA). In doing so, the base station 2170a-2170b may implement protocols such as HSPA, HSPA+ optionally including HSDPA, HSUPA or both. Alternatively, a base station 2170a-2170b may establish an air interface 2190 with Evolved UTMS Terrestrial Radio Access (E-UTRA) using LTE, LTE-A, and/or LTE-B. It is contemplated that the communication system 2100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 2120a-2120b are in communication with the core network 2130 to provide the UEs 2110a-2110c with various services such as voice, data, and other services. The RANs 2120a-2120b and/or the core network 2130 may be in direct or indirect communication with one or more other RANs (not shown), which may or may not be directly served by core network 2130, and may or may not employ the same radio access technology as RAN 2120a, RAN 2120b or both. The core network 2130 may also serve as a gateway access between (i) the RANs 2120a-2120b or UEs 2110a-2110c or both, and (ii) other networks (such as the PSTN 2140, the internet 2150, and the other networks 2160). In addition, some or all of the UEs 2110a-2110c may include functionality for communicating with different wireless networks over different wireless links using different wireless technologies and/or protocols. Instead of wireless communication (or in addition thereto), the UEs may communicate via wired communication channels to a service provider or switch (not shown), and to the internet 2150. PSTN 2140 may include circuit switched telephone networks for providing plain old telephone service (POTS). Internet 2150 may include a network of computers and subnets (intranets) or both, and incorporate protocols, such as IP, TCP, UDP. UEs 2110a-2110c may be multimode devices capable of operation according to multiple radio access technologies, and incorporate multiple transceivers necessary to support such.

Figure 22A:
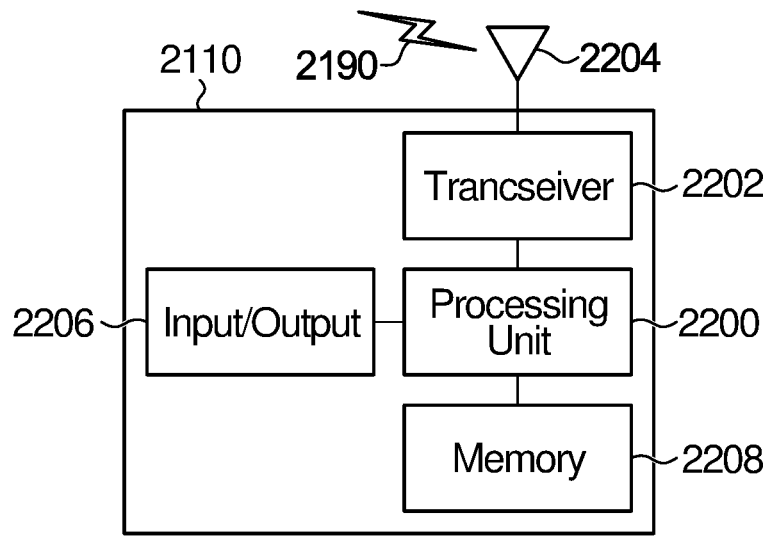
FIGS. 22A and 22B are block diagrams of an example base station and example user equipment, respectively.
Figure 22B:
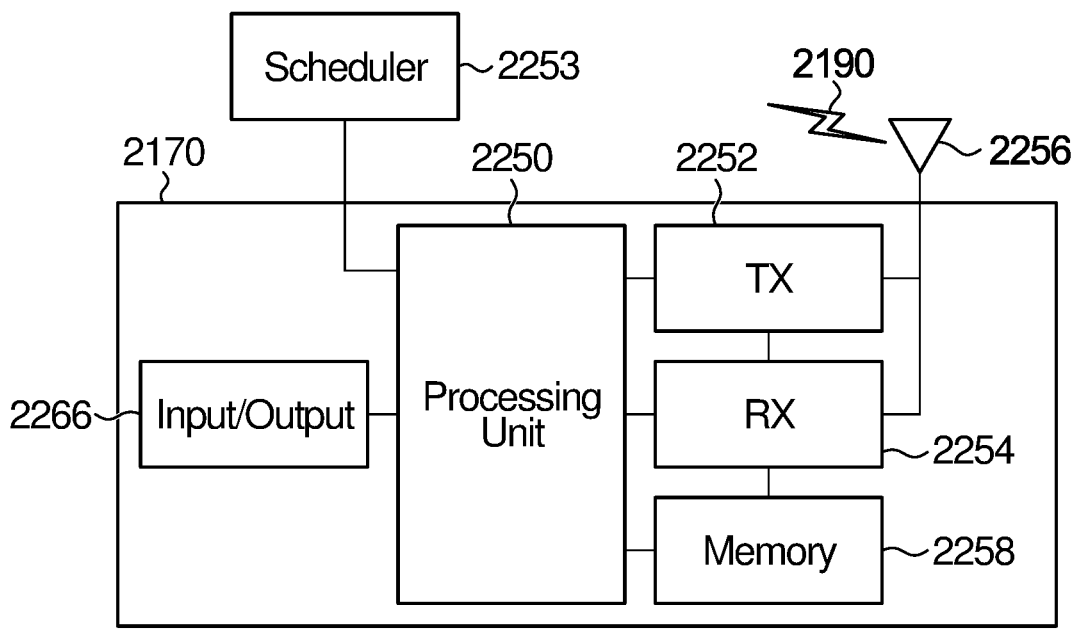

FIGS. 22A and 22B illustrate example devices that may implement the methods and teachings according to this disclosure. In particular, FIG. 22A illustrates an example UE 2110, and FIG. 22B illustrates an example base station 2170. These components could be used in the communication system 2100 or in any other suitable system.

As shown in FIG. 22A, the UE 2110 includes at least one processing unit 2200. The processing unit 2200 implements various processing operations of the UE 2110. For example, the processing unit 2200 could perform signal coding, data processing, power control, input/output processing, or any other functionality enabling the UE 2110 to operate in the communication system 2100. The processing unit 2200 may also be configured to implement some or all of the functionality and/or embodiments described in more detail above. Each processing unit 2200 includes any suitable processing or computing device configured to perform one or more operations. Each processing unit 2200 could, for example, include a microprocessor, microcontroller, digital signal processor, field programmable gate array, or application specific integrated circuit.

The UE 2110 also includes at least one transceiver 2202. The transceiver 2202 is configured to modulate data or other content for transmission by at least one antenna or Network Interface Controller (NIC) 2204. The transceiver 2202 is also configured to demodulate data or other content received by the at least one antenna 2204. Each transceiver 2202 includes any suitable structure for generating signals for wireless or wired transmission and/or processing signals received wirelessly or by wire. Each antenna 2204 includes any suitable structure for transmitting and/or receiving wireless or wired signals. One or multiple transceivers 2202 could be used in the UE 2110. One or multiple antennas 2204 could be used in the UE 2110. Although shown as a single functional unit, a transceiver 2202 could also be implemented using at least one transmitter and at least one separate receiver.

The UE 2110 further includes one or more input/output devices 2206 or interfaces (such as a wired interface to the internet 2150). The input/output devices 2206 permit interaction with a user or other devices in the network. Each input/output device 2206 includes any suitable structure for providing information to or receiving information from a user, such as a speaker, microphone, keypad, keyboard, display, or touch screen, including network interface communications.

In addition, the UE 2110 includes at least one memory 2208. The memory 2208 stores instructions and data used, generated, or collected by the UE 2110. For example, the memory 2208 could store software instructions or modules configured to implement some or all of the functionality and/or embodiments described above and that are executed by the processing unit(s) 2200. Each memory 2208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 22B, the base station 2170 includes at least one processing unit 2250, at least one transmitter 2252, at least one receiver 2254, one or more antennas 2256, at least one memory 2258, and one or more input/output devices or interfaces 2266. A transceiver, not shown, may be used instead of the transmitter 2252 and receiver 2254. A scheduler 2253 may be coupled to the processing unit 2250. The scheduler 2253 may be included within or operated separately from the base station 2170. The processing unit 2250 implements various processing operations of the base station 2170, such as signal coding, data processing, power control, input/output processing, or any other functionality. The processing unit 2250 can also be configured to implement some or all of the functionality and/or embodiments described in more detail above. Each processing unit 2250 includes any suitable processing or computing device configured to perform one or more operations. Each processing unit 2250 could, for example, include a microprocessor, microcontroller, digital signal processor, field programmable gate array, or application specific integrated circuit.

Each transmitter 2252 includes any suitable structure for generating signals for wireless or wired transmission to one or more UEs or other devices. Each receiver 2254 includes any suitable structure for processing signals received wirelessly or by wire from one or more UEs or other devices.

Although shown as separate components, at least one transmitter 2252 and at least one receiver 2254 could be combined into a transceiver. Each antenna 2256 includes any suitable structure for transmitting and/or receiving wireless or wired signals. Although a common antenna 2256 is shown here as being coupled to both the transmitter 2252 and the receiver 2254, one or more antennas 2256 could be coupled to the transmitter(s) 2252, and one or more separate antennas 2256 could be coupled to the receiver(s) 2254. Each memory 2258 includes any suitable volatile and/or non-volatile storage and retrieval device(s) such as those described above in connection to the UE 2110. The memory 2258 stores instructions and data used, generated, or collected by the base station 2170. For example, the memory 2258 could store software instructions or modules configured to implement some or all of the functionality and/or embodiments described above and that are executed by the processing unit(s) 2250.

Each input/output device 2266 permits interaction with a user or other devices in the network. Each input/output device 2266 includes any suitable structure for providing information to or receiving/providing information from a user, including network interface communications.

It should be appreciated that certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein. In some examples of implementation, any feature of any embodiment discussed herein may be combined with any feature of any other embodiment discussed herein.

Any feature of any embodiment and/or example discussed herein may be combined with any feature of any other embodiment and/or example discussed herein in some examples of implementation.

Figure 23:
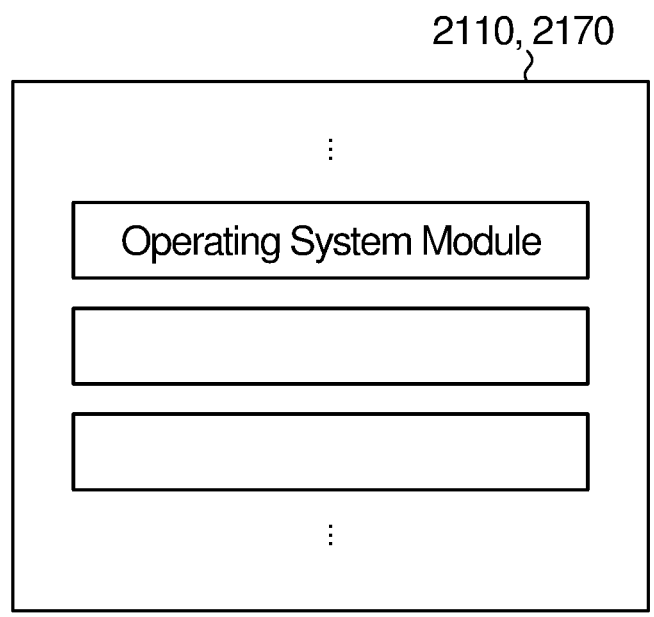
FIG. 23 is a block diagram of component modules.

It should be appreciated that one or more steps of the embodiment methods provided herein may be performed by corresponding units or modules, according to FIG. 23. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Details of the UEs 2110 and the base stations 2170 that are known to those of skill in the art are omitted here for clarity.

In accordance with a first aspect of the present disclosure, there is provided a method of path loss estimation at a user equipment (UE), comprising: receiving a downlink cell-specific signal block comprising a synchronization channel and a broadcasting channel demodulation reference signal; receiving control information indicative of a signal transmission power of the downlink cell-specific signal block; and determining an estimated path loss for the UE based at least in part on the signal transmission power of the downlink cell-specific signal block and a received power of the downlink cell-specific signal block filtered using a layer 3 filtering coefficient.

Optionally, in some embodiments of the first aspect, the method further comprises receiving the layer 3 filtering coefficient from a base station.

Optionally, in some embodiments of the first aspect, the method further comprises storing the layer 3 filtering coefficient as a default value in a memory of the UE.

Optionally, in some embodiments of the first aspect, the method further comprises receiving at least one downlink UE-specific reference signal, wherein the path loss for the UE is not based on any of the at least one downlink UE-specific reference signal.

In accordance with a second aspect of the present disclosure, there is provided a wireless device that includes one or more processors and a memory storage having instructions stored thereon that when executed by the one or more processors cause the one or more processors to perform a method according to the first aspect of the present disclosure.

In accordance with a third aspect of the present disclosure, there is provided a method of path loss estimation at a user equipment (UE), comprising: receiving a plurality of distinct downlink cell-specific signal blocks; receiving control information indicative of a signal transmission power for each of the downlink cell-specific signal blocks; and determining a plurality of estimated path losses for the UE, each estimated path loss corresponding to one of the plurality of downlink cell-specific signal blocks and derived at least in part from the signal transmission power and a received power of the downlink cell-specific signal block filtered using a layer 3 filtering coefficient.

Optionally, in some embodiments of the third aspect, the method further comprises receiving the layer 3 filtering coefficient from a base station.

Optionally, in some embodiments of the third aspect, the method further comprises storing the layer 3 filtering coefficient as a default value in a memory of the UE.

Optionally, in some embodiments of the third aspect, the method further comprises selecting one estimated path loss from the plurality of estimated path losses as the estimated path loss for the UE.

Optionally, in some embodiments of the third aspect, the method further comprises receiving at least one downlink UE-specific reference signal and determining a plurality of distinct estimated path losses for the UE, each of the estimated path losses corresponding to a respective one of the cell-specific signal blocks and derived from the plurality of distinct downlink cell-specific signal blocks and not from the at least one downlink UE-specific reference signal.

In accordance with a fourth aspect of the present disclosure, there is provided a wireless device that includes one or more processors and a memory storage having instructions stored thereon that when executed by the one or more processors cause the one or more processors to perform a method according to the third aspect of the present disclosure.

In accordance with a fifth aspect, there is provided a method of path loss estimation at a UE, comprising: receiving a downlink UE-specific reference signal; receiving control information indicative of a signal transmission power of the UE-specific reference signal; and determining an estimated path loss for the UE based at least in part on the signal transmission power and a received power of the downlink UE-specific reference signal filtered using a layer 1 or layer 2 filtering coefficient.

Optionally, in some embodiments of the fifth aspect, the method further comprises receiving the layer 1 or layer 2 filtering coefficient from a base station.

Optionally, in some embodiments of the fifth aspect, the method further comprises storing the layer 1 or layer 2 filtering coefficient as a default value in a memory of the UE.

In accordance with a sixth aspect of the present disclosure, there is provided a wireless device that includes one or more processors and a memory storage having instructions stored thereon that when executed by the one or more processors cause the one or more processors to perform a method according to the fifth aspect of the present disclosure.

In accordance with a seventh aspect of the present disclosure, there is provided a method of path loss estimation at UE (user equipment), comprising: receiving a plurality of distinct downlink UE-specific reference signals; receiving control information indicative of a signal transmission power for each of the UE-specific reference signals; and determining a plurality of estimated path losses for the UE, each estimated path loss corresponding to one of the downlink UE-specific reference signals and derived at least in part from the signal transmission power and a received power of that downlink UE-specific reference signal filtered using a layer 1 or layer 2 filtering coefficient.

Optionally, in some embodiments of the seventh aspect, the method further comprises receiving the layer 1 or layer 2 filtering coefficient from a base station.

Optionally, in some embodiments of the seventh aspect, the method further comprises storing the layer 1 or layer 2 filtering coefficient as a default value in a memory of the UE.

Optionally, in some embodiments of the seventh aspect, the method further comprises receiving indication signaling for path loss selection and selecting a particular one of the estimated path losses according to the indication signaling.

In accordance with a eighth aspect of the present disclosure, there is provided a wireless device that includes one or more processors and a memory storage having instructions stored thereon that when executed by the one or more processors cause the one or more processors to perform a method according to the seventh aspect of the present disclosure.

In accordance with a ninth aspect of the present disclosure, there is provided a method of path loss estimation at a user equipment (UE), comprising: receiving a plurality of distinct downlink UE-specific reference signal sets, each set comprising at least one downlink UE-specific reference signal; receiving control information indicating a signal transmission power for each UE-specific reference signal in each UE-specific reference signal set; determining a plurality of estimated path losses for the UE, each estimated path loss corresponding to a respective one of the downlink UE-specific reference signal sets and, for each downlink UE-specific reference signal set, the estimated path loss corresponding to that UE-specific reference signal set being derived at least in part from the signal transmission power for each downlink UE-specific reference signal in that UE-specific reference signal set and a received power of that downlink UE-specific reference signal filtered using a layer 1 or layer 2 filtering coefficient.

Optionally, in some embodiments of the ninth aspect, the method further comprises receiving indication signaling for path loss selection and selecting a particular one of the estimated path losses according to the indication signaling.

Optionally, in some embodiments of the ninth aspect, the method further comprises determining the layer 1 or layer 2 filtering coefficient from the indication signaling.

Optionally, in some embodiments of the ninth aspect, the method further comprises storing the layer 1 or layer 2 filtering coefficient as a default value in a memory of the UE.

In accordance with a tenth aspect of the present disclosure, there is provided a wireless device that includes one or more processors and a memory storage having instructions stored thereon that when executed by the one or more processors cause the one or more processors to perform a method according to the ninth aspect of the present disclosure.

In accordance with a eleventh aspect of the present disclosure, there is provided a method of path loss estimation at a UE, comprising: receiving a downlink cell-specific signal block; receiving a downlink UE-specific reference signal; and determining an estimated path loss based at least in part on a first filtered path loss derived from the downlink cell-specific signal block filtered using a layer 3 filtering coefficient and a second filtered path loss derived from the UE-specific reference signal set filtered with a layer 1 or layer 2 filtering coefficient.

Optionally, in some embodiments of the eleventh aspect, the method further comprises receiving control signaling for path loss selection and apportioning determination of the estimated path loss between the first filtered path loss and the second filtered path loss according to the control signaling.

In accordance with a twelfth aspect of the present disclosure, there is provided a wireless device that includes one or more processors and a memory storage having instructions stored thereon that when executed by the one or more processors cause the one or more processors to perform a method according to the eleventh aspect of the present disclosure.

In accordance with a thirteenth aspect of the present disclosure, there is provided a method of path loss estimation at a user equipment (UE), comprising: receiving a downlink cell-specific signal block; receiving a downlink UE-specific reference signal; determining estimated path loss for a first channel based at least in part on a received power of the downlink cell-specific signal block and not a received power of the downlink UE-specific reference signal, if the UE is configured to use cell-specific signal block-based path loss for the first channel; determining estimated path loss for a second channel based at least in part on the received power of the downlink UE-specific reference signal and not the received power of the downlink cell-specific signal block, if the UE is configured to use UE-specific reference signal-based path loss for the second channel Optionally, in some embodiments of the thirteenth aspect, the method further comprises determining estimated path loss for a third channel based at least in part on both the received power of the downlink UE-specific reference signal and the received power of the downlink cell-specific signal block, if the UE is configured to use both cell-specific signal block- and UE-specific reference signal-based path loss for the third channel.

In accordance with a fourteenth aspect of the present disclosure, there is provided a wireless device that includes one or more processors and a memory storage having instructions stored thereon that when executed by the one or more processors cause the one or more processors to perform a method according to the thirteenth aspect of the present disclosure.

In accordance with a fifteenth aspect of the present disclosure, there is provided a method of path loss estimation at a user equipment (UE), comprising: entering an inactive state from an active state, the inactive state being different from an idle state; receiving a downlink cell-specific signal block; and determining an estimated path loss for the UE based at least in part on a received power of the downlink cell-specific signal block determined while the UE is in the inactive state or a stored path loss value determined while the UE was in the active state.

Optionally, in some embodiments of the fifteenth aspect, the method further comprises obtaining a layer 3 filtering coefficient while the UE is the inactive state; determining the received power of the downlink cell-specific signal block while the UE is in the inactive state; and filtering the received power of the downlink cell-specific signal block using the layer 3 filtering coefficient to determine the estimated path loss for the UE while the UE is in the inactive state.

In accordance with a sixteenth aspect of the present disclosure, there is provided a wireless device that includes one or more processors and a memory storage having instructions stored thereon that when executed by the one or more processors cause the one or more processors to perform a method according to the fifteenth aspect of the present disclosure.

Although various embodiments and examples have been presented, this was for the purpose of describing, but not limiting, the invention. Various modifications and enhancements will become apparent to those of ordinary skill in the art and are within the scope of the invention, which is defined by the appended claims.

What is claimed is:

1. A method comprising:
receiving, by a device, a downlink cell-specific signal block configuration;
receiving, by the device, a downlink user equipment (UE)-specific reference signal configuration;
determining, by the device, that a path loss estimation of a channel is based on a path loss reference signal, the path loss reference signal being one of a downlink cell-specific signal block corresponding to the downlink cell-specific signal block configuration or a UE-specific reference signal corresponding to the downlink UE-specific reference signal configuration; and
determining, by the device, an estimated path loss for the channel based on a received power of the path loss reference signal.

2. The method of claim 1, wherein the downlink cell-specific signal block comprises a synchronization signal and a broadcasting channel demodulation reference signal.

3. The method of claim 1, wherein the downlink UE-specific reference signal comprises a channel state information-reference signal (CSI-RS).

4. The method of claim 1, wherein the received power of the path loss reference signal is filtered using a layer 3 filter coefficient.

5. The method of claim 4, further comprising:
receiving the layer 3 filter coefficient from a base station.

6. The method of claim 4, wherein the layer 3 filtering coefficient is a default value stored in the device.

7. The method of claim 4, further comprising:
receiving control information indicative of a reference signal transmission power;
wherein the estimated path loss is determined in accordance with the reference signal transmission power and the received power of the path loss reference signal filtered using the layer 3 filter coefficient.

8. A device, comprising:
one or more processors; and
a memory storage having instructions stored thereon that, when executed by the one or more processors, cause the device to perform steps of:
receiving a downlink cell-specific signal block configuration;
receiving a downlink user equipment (UE)-specific reference signal configuration;
determining that a path loss estimation of a channel is based on a path loss reference signal, the path loss reference signal being one of a downlink cell-specific signal block corresponding to the downlink cell-specific signal block configuration or a UE-specific reference signal corresponding to the downlink UE-specific reference signal configuration; and
determining an estimated path loss for the channel based on a received power of the path loss reference signal.

9. The device of claim 8, wherein the downlink cell-specific signal block comprises a synchronization signal and a broadcasting channel demodulation reference signal.

10. The device of claim 8, wherein the downlink UE-specific reference signal comprises a channel state information-reference signal (CSI-RS).

11. The device of claim 8, wherein the received power of the path loss reference signal is filtered using a layer 3 filter coefficient.

12. The device of claim 11, wherein the instructions when executed by the one or more processors cause the device further to perform a step of receiving the layer 3 filter coefficient from a base station.

13. The device of claim 11, wherein the layer 3 filtering coefficient is a default value stored in the device.

14. The device of claim 11, wherein the instructions when executed by the one or more processors cause the device to perform a step of receiving control information indicative of a reference signal transmission power;
wherein the estimated path loss is determined in accordance with the reference signal transmission power and the received power of the path loss reference signal filtered using the layer 3 filter coefficient.

15. A non-transitory computer-readable medium storing computer instructions, that when executed by one or more processors, cause the one or more processors to perform steps of:
receiving a downlink cell-specific signal block configuration;
receiving a downlink user equipment (UE)-specific reference signal configuration;
determining that a path loss estimation of a channel is based on a path loss reference signal, the path loss reference signal being one of a downlink cell-specific signal block corresponding to the downlink cell-specific signal block configuration or a UE-specific reference signal corresponding to the downlink UE-specific reference signal configuration; and
determining an estimated path loss for the channel based on a received power of the path loss reference signal.

16. The non-transitory computer-readable medium of claim 15, wherein the downlink cell-specific signal block comprises a synchronization signal and a broadcasting channel demodulation reference signal.

17. The non-transitory computer-readable medium of claim 15, wherein the downlink UE-specific reference signal comprises a channel state information-reference signal (CSI-RS).

18. The non-transitory computer-readable medium of claim 15, wherein the received power of the path loss reference signal is filtered using a layer 3 filter coefficient.

19. The non-transitory computer-readable medium of claim 18, wherein the non-transitory computer-readable medium stores further computer instructions, that when executed by the one or more processors, cause the one or more processors to perform a step of receiving the layer 3 filter coefficient from a base station.

20. The non-transitory computer-readable medium of claim 18, wherein the non-transitory computer-readable medium stores further computer instructions, that when executed by the one or more processors, cause the one or more processors to perform a step of receiving control information indicative of a reference signal transmission power; and wherein the estimated path loss is determined in accordance with the reference signal transmission power and the received power of the path loss reference signal filtered using the layer 3 filter coefficient.

\* \* \* \* \*